United States Patent
Tezuka

(10) Patent No.: US 6,826,354 B2
(45) Date of Patent: *Nov. 30, 2004

(54) BUFFER CONTROL METHOD AND BUFFER CONTROL DEVICE

(75) Inventor: Yasuo Tezuka, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,837

(22) Filed: Jun. 10, 1999

(65) Prior Publication Data
US 2002/0118882 A1 Aug. 29, 2002

(30) Foreign Application Priority Data
Oct. 15, 1998 (JP) .......................... 10-293832

(51) Int. Cl.$^7$ ............................. G06K 9/68
(52) U.S. Cl. ................. 392/218; 358/1.16; 382/218; 382/306; 709/212; 709/213; 709/245; 711/3; 711/109; 711/111; 711/145; 710/3; 710/9; 710/23; 710/26; 710/52
(58) Field of Search .................. 382/218–219, 382/305–306, 318–319; 358/1.2, 1.13, 1.16, 1.15, 1.17, 448; 370/509, 382, 383; 375/368; 711/3, 9, 22–23, 26, 52, 56, 111, 145; 709/212, 213, 245

(56) References Cited

U.S. PATENT DOCUMENTS

| 4,949,301 | A | * | 8/1990 | Joshi et al. ................. 711/100 |
| 5,045,967 | A | * | 9/1991 | Igarashi ...................... 345/431 |
| 5,379,127 | A | * | 1/1995 | Ando .......................... 358/448 |
| 5,404,539 | A | * | 4/1995 | Onozaki ...................... 710/240 |
| 5,481,549 | A | * | 1/1996 | Tokuyama ................... 714/744 |
| 5,511,149 | A | * | 4/1996 | Hayano ....................... 358/1.13 |
| 5,555,559 | A | * | 9/1996 | Tsubota ........................ 710/59 |
| 5,631,671 | A | * | 5/1997 | Katsura et al. ............. 345/200 |
| 5,665,953 | A | * | 9/1997 | Mazzamuto ................. 235/383 |
| 5,691,997 | A | * | 11/1997 | Lackey, Jr. ................... 371/53 |
| 5,859,954 | A | * | 1/1999 | Toda ............................ 358/1.2 |
| 5,896,134 | A | * | 4/1999 | Hashimoto ................... 345/422 |
| 5,920,529 | A | * | 7/1999 | Ota et al. ...................... 369/47 |
| 5,996,043 | A | * | 11/1999 | Manning ..................... 711/105 |
| 6,016,541 | A | * | 1/2000 | Tashima et al. ............. 712/207 |
| 6,041,053 | A | * | 3/2000 | Douceur ...................... 370/389 |
| 6,044,076 | A | * | 3/2000 | Yamamoto .................. 370/392 |
| 6,047,004 | A | * | 4/2000 | Koyama ...................... 370/509 |
| 6,047,111 | A | * | 4/2000 | Sugiura et al. ............. 358/1.15 |
| 6,067,301 | A | * | 5/2000 | Aatresh ....................... 370/418 |
| 6,092,116 | A | * | 7/2000 | Earnest et al. .............. 709/236 |
| 6,098,100 | A | * | 8/2000 | Wey et al. ................... 709/223 |
| 6,128,096 | A | * | 10/2000 | Furuya et al. ............. 358/1.17 |
| 6,128,282 | A | * | 10/2000 | Liebetreu et al. ............ 370/235 |
| 6,151,658 | A | * | 11/2000 | Magro ......................... 711/110 |
| 6,175,874 | B1 | * | 1/2001 | Imai et al. ................... 709/238 |
| 6,215,817 | B1 | * | 4/2001 | Kimura ....................... 375/220 |
| 6,301,248 | B1 | * | 10/2001 | Jung et al. ................... 370/392 |
| 6,301,256 | B1 | * | 10/2001 | Vasa ........................... 370/401 |
| 6,332,152 | B1 | * | 12/2001 | Ohashi et al. .............. 708/490 |
| 6,393,033 | B1 | * | 5/2002 | Woodward et al. ......... 370/474 |
| 6,606,317 | B1 | * | 8/2003 | Beadle et al. ............... 370/390 |

FOREIGN PATENT DOCUMENTS

| JP | 5-270093 | 10/1993 |
| JP | 8-272813 | 10/1996 |
| JP | 10-21339 | 1/1998 |

* cited by examiner

Primary Examiner—Bhavesh M. Mehta
Assistant Examiner—Gregory Desire
(74) Attorney, Agent, or Firm—Katten Muchin Zavis Rosenman

(57) ABSTRACT

A buffer control device for controlling a buffer memory includes a comparing unit which compares input data with one or more data patterns, a control unit which stores a code which indicates a data pattern among data patterns into said buffer memory if the input data matches with the data pattern, and a recovering unit which recovers the input data from the code.

16 Claims, 29 Drawing Sheets

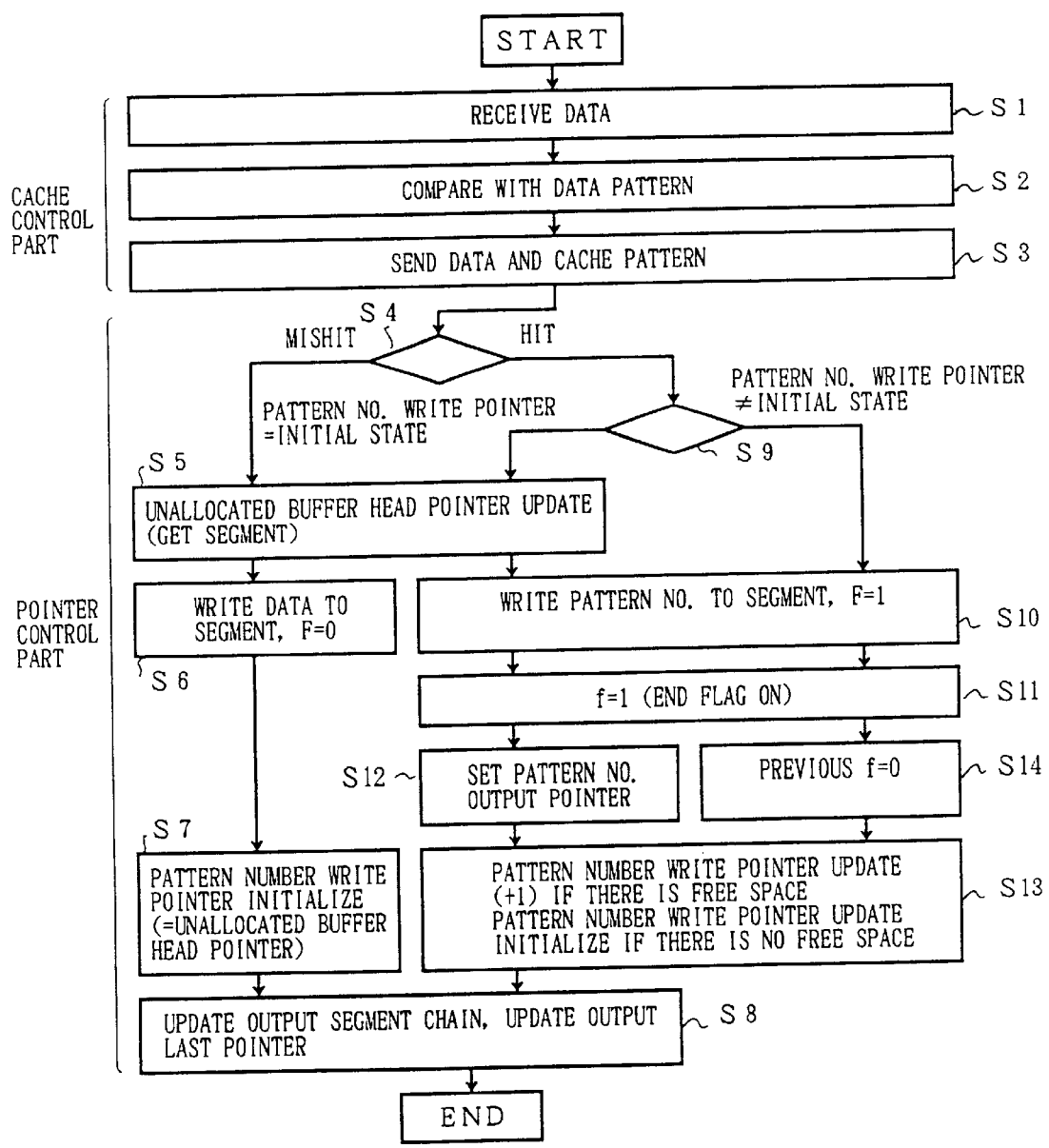

BUFFER CONTROL METHOD AND BUFFER CONTROL DEVICE

BACKGROUND OF THE INVENTION

1. Field of the Invention

The present invention generally relates to a buffer control technique. More particularly, the present invention relates to a buffer control method and a buffer control device which decrease use of a buffer memory area and avoid a buffer overflow when data is stored in a buffer memory for packet protocol processing during inputting of data, controlling an output rate of data, and the like.

2. Description of the Related Art

FIG. 1 is a block diagram showing an example of a buffer control device 10. The buffer control device 10 includes a buffer control part 14 for controlling packet processing in a packet processing part 46 and for controlling buffer chaining in a buffer memory 26, and an output scheduling part 12 for controlling an output instruction to the buffer control part 14 and for controlling data output.

The buffer control part 14 has an unallocated buffer head pointer 16, an unallocated buffer last pointer 18, a pointer control part 20 for controlling each pointer, an output head pointer 22, and an output last pointer 24. The operation of the buffer control device 10 is as follows.

When contiguous segments of data 2 are input in the buffer control device 10, buffer chaining in the buffer memory 26 for storing the data is performed by the pointer control part 20 and the data is stored per segment in the buffer memory 26 temporarily. The segment is a data storing unit in the buffer memory 26. In the meantime, if packet processing is required, packet processing, such as a packet assembly, is performed in the packet processing part 46. Moreover, if it is necessary to adjust an output rate beforehand, in other words, if shaping is necessary, data will be stored in the buffer memory 26 over a period of time necessary for adjusting the output rate.

After that, the output scheduling part 12 instructs the buffer control part 14 to output data. Then, the buffer control part 14 controls a pointer and data 4 which is arranged per segment or data 6 which has been assembled into packets is output. On one hand, the data 4 consisting of segments has intervals between the segments, which interval is caused by adjusting the output rate. On the other hand, the data 6 has intervals between packets, which intervals are caused by packet processing.

FIG. 2 is a block diagram showing the configuration of the buffer memory 26. In the following, the configuration of the buffer memory 26 and the function of each of the pointers in the buffer control part 14 in FIG. 1 will be described with reference to FIG. 2.

As shown in FIG. 2, the buffer memory 26 stores an unallocated buffer chain 27 and an output buffer chain 28. Each of the unallocated buffer chain 27 and the output buffer chain 28 includes segments. Hereinafter, each of the segments in the unallocated buffer chain 27 will be called an unallocated segment, and each of the segments in the output buffer chain 28 will be called an output segment.

The unallocated buffer head pointer 16 indicates a head segment address of the unallocated buffer chain 27, and the unallocated buffer last pointer 18 indicates an end segment address of the unallocated buffer chain 27. The output head pointer 22 indicates a head segment address of the output buffer chain 28, and the output last pointer 24 shows an end segment address of the output buffer chain 28. A next segment address 29 in the output segment indicates an address of a next output segment. Input data is stored in each of the output segments.

FIGS. 3A, 3B, and 3C show a case in which three sets of data are stored in the buffer memory 26. When first data is received as shown in FIG. 3A, one segment is allocated as an output segment from an unallocated buffer queue, that is an unallocated buffer chain, and data X-1 is stored in the output segment. The unallocated buffer head pointer 16 points to a next unallocated segment.

As shown in FIGS. 3B and 3C, when a second data and a third data are received, unallocated segments are allocated according to the amount of data. That is, in the conventional buffer control technique, received data is stored in a buffer memory as it is.

Recently, as high-speed communication in which data is highly multiplexed is spreading in an ATM communication and other communication fields, a larger amount of the same data is transmitted at high speed in a case of using a multicasting technique or the like. Therefore, according to the above-mentioned conventional technique in which the amount of the buffer memory is the same as the amount of the data received even if the data is the same data, there are problems that a large memory space is necessary for buffering and that a buffer overflow may occur during packet protocol processing, output rate controlling, and the like.

SUMMARY OF THE INVENTION

It is a general object of the present invention to provide a buffer control method and a buffer control device in which the above problems are eliminated.

A more specific object of the present invention is to provide a buffer control method and a buffer control device which decrease use of a buffer memory area and avoid a buffer overflow when data is stored in a buffer memory for packet protocol processing, controlling an output rate, and the like.

The above objects of the present invention are achieved by a buffer control method for controlling a buffer memory, the method including the steps of:

comparing input data with one or more data patterns;

storing a code which indicates a data pattern among data patterns into the buffer memory if the input data matches with the data pattern; and recovering the input data from the code.

According to the present invention, the usage of the buffer memory can be decreased and a buffer overflow can be avoided since a code instead of input data is written in the buffer memory.

BRIEF DESCRIPTION OF THE DRAWINGS

Other objects, features and advantages of the present invention will become more apparent from the following detailed description when read in conjunction with the accompanying drawings, in which:

FIG. 6 is a flowchart showing the operation of a buffer control device according to the first embodiment when receiving data;

DETAILED DESCRIPTION OF THE PREFERRED EMBODIMENTS

In the following, embodiments of the present invention will be described with reference to the figures.

Figure 1:
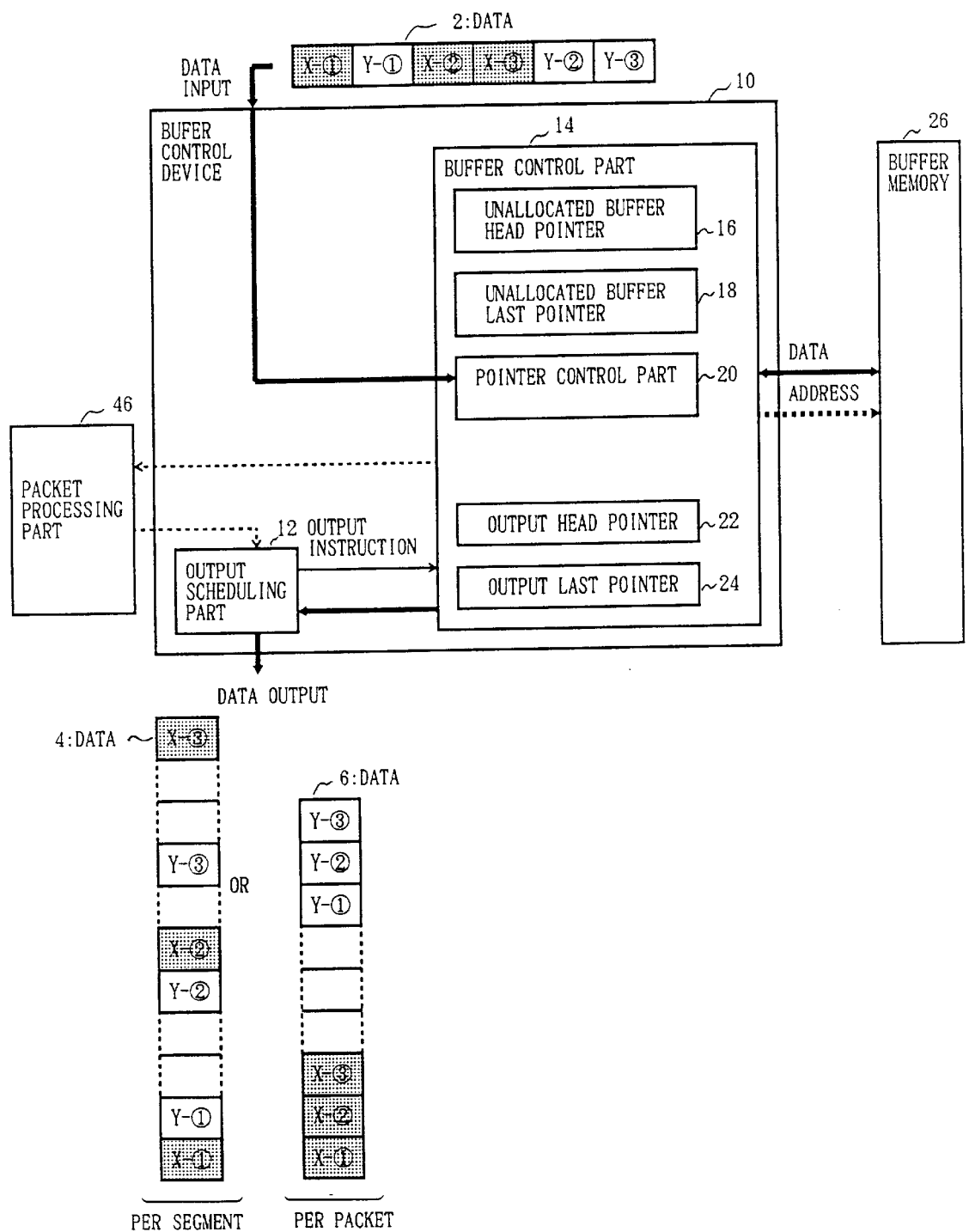
FIG. 1 is a block diagram showing a conventional buffer control device.
Figure 2:
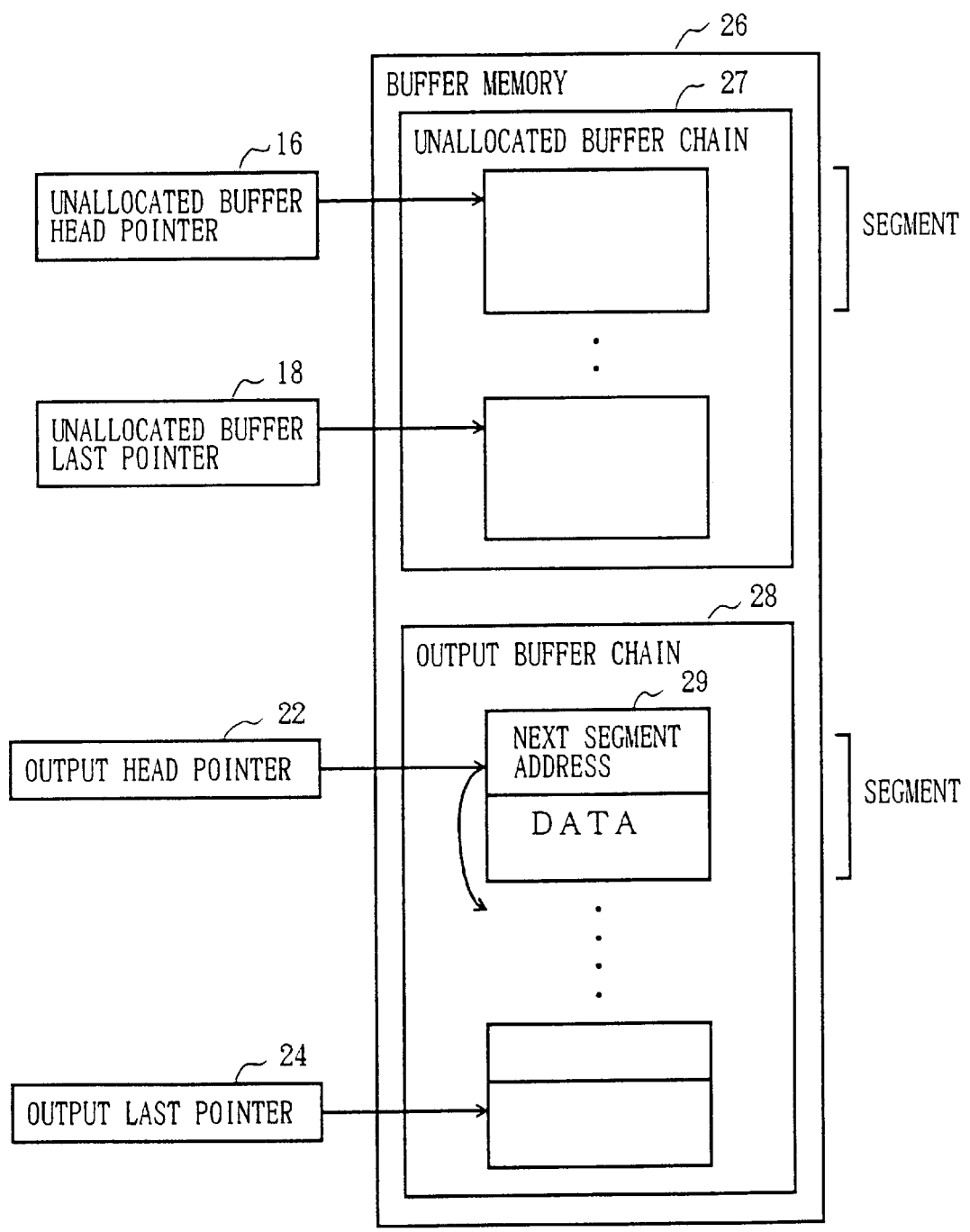
FIG. 2 is a block diagram showing the configuration of a buffer memory 26 in FIG. 1.
Figure 3A:
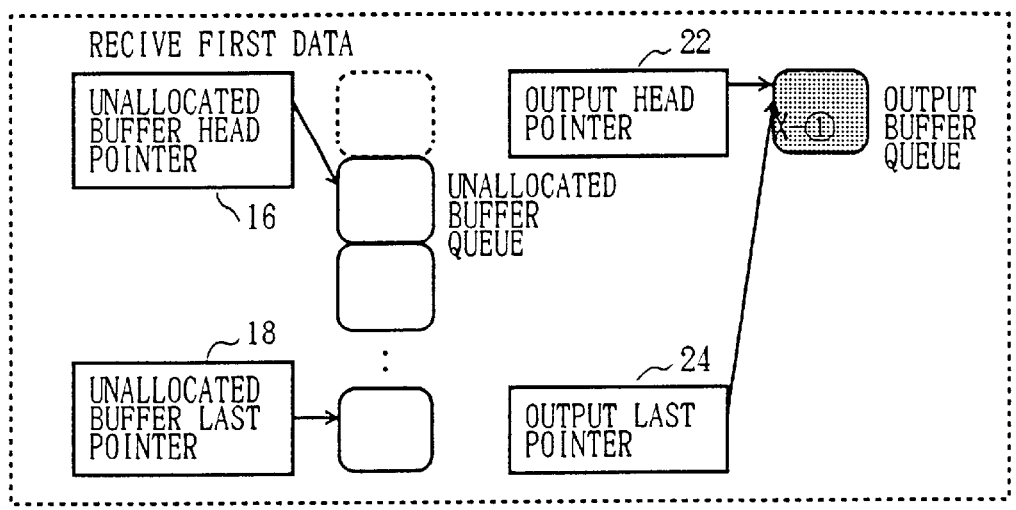
FIG. 3A is a diagram explaining a case in which first data is received in the buffer memory 26.
Figure 3B:
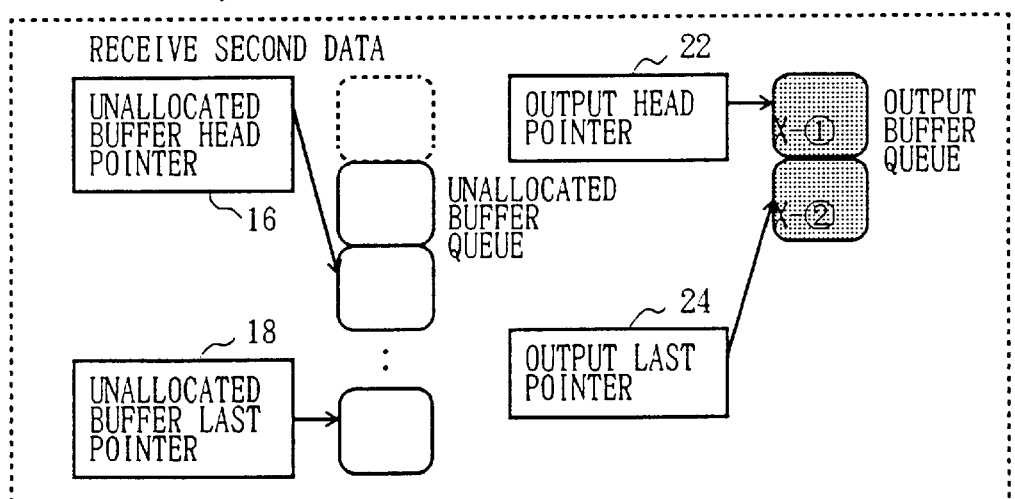
FIG. 3B is a diagram explaining a case in which second data is received in the buffer memory 26.
Figure 3C:
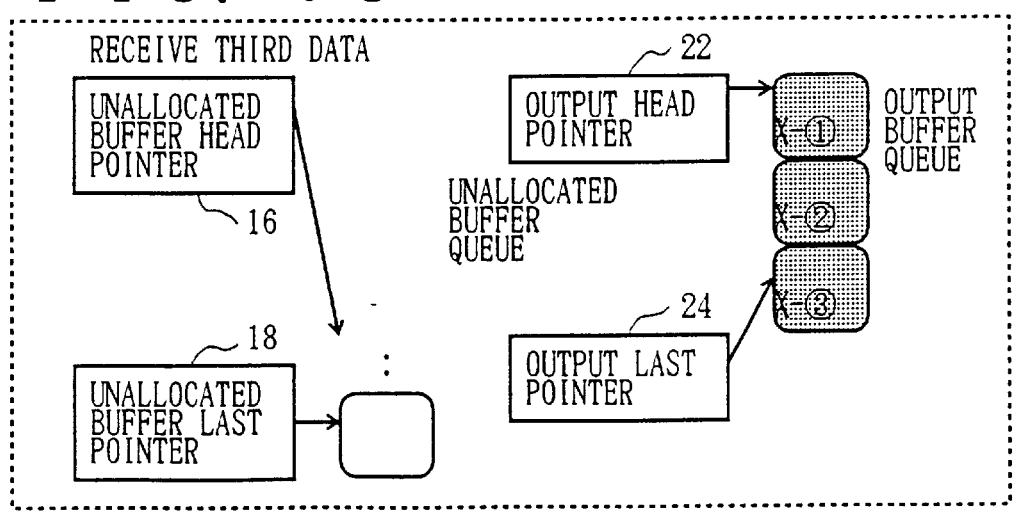
FIG. 3C is a diagram explaining a case in which third data is received in the buffer memory 26.
Figure 4:
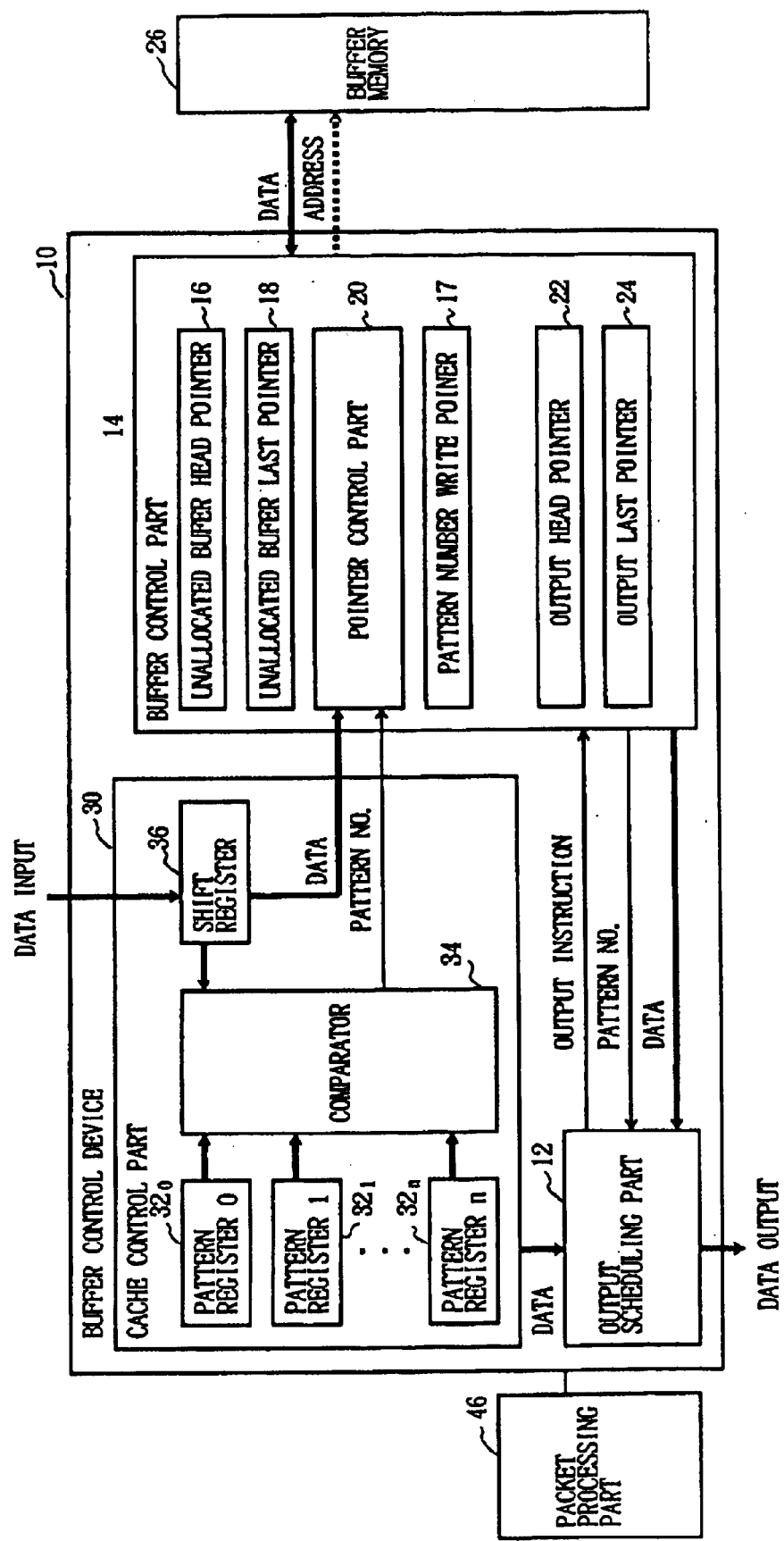
FIG. 4 is a block diagram showing a buffer control device according to a first embodiment of the present invention.

FIG. 4 is a block diagram showing a buffer control device 10 according to a first embodiment of the present invention. This embodiment is most amenable to a case in which input data has a fixed format such that a data pattern can be predictable. In FIG. 4, the buffer control device 10 includes the buffer control part 14 for controlling packet assembling in a packet processing part 46 and for controlling buffer chaining in a buffer memory 26, a cache control part 30 for comparing received data with data patterns which are set beforehand, and an output scheduling part 12 for controlling data output instructions to the buffer control part 14 and output of pattern data.

The cache control part 30 includes a shift register 36 for storing received data temporally, pattern registers $32_0$–$32_n$ which store data patterns beforehand, and a comparator 34 for comparing the contents of the shift register 36 and the pattern registers $32_0$–$32_n$.

The buffer control part 14 includes an unallocated buffer head pointer 16, an unallocated buffer last pointer 18, a pointer control part 20 for controlling each of the pointers, a pattern number write pointer 17, an output head pointer 22, and an output last pointer 24. Hereinafter, each code which indicates each of the data patterns will be called a pattern number.

In FIG. 4, the comparator 34 can be configured by, for example, XOR circuits. Each of the pattern registers $32_0$–$32_n$ can be formed by a FF circuit or a memory, and the contents can be set or changed by software. Each pointer in the buffer control part 14 can be configured by a FF circuit or a memory. The pointer control part 20 can be formed by hardware logic or a software program.

Figure 5:
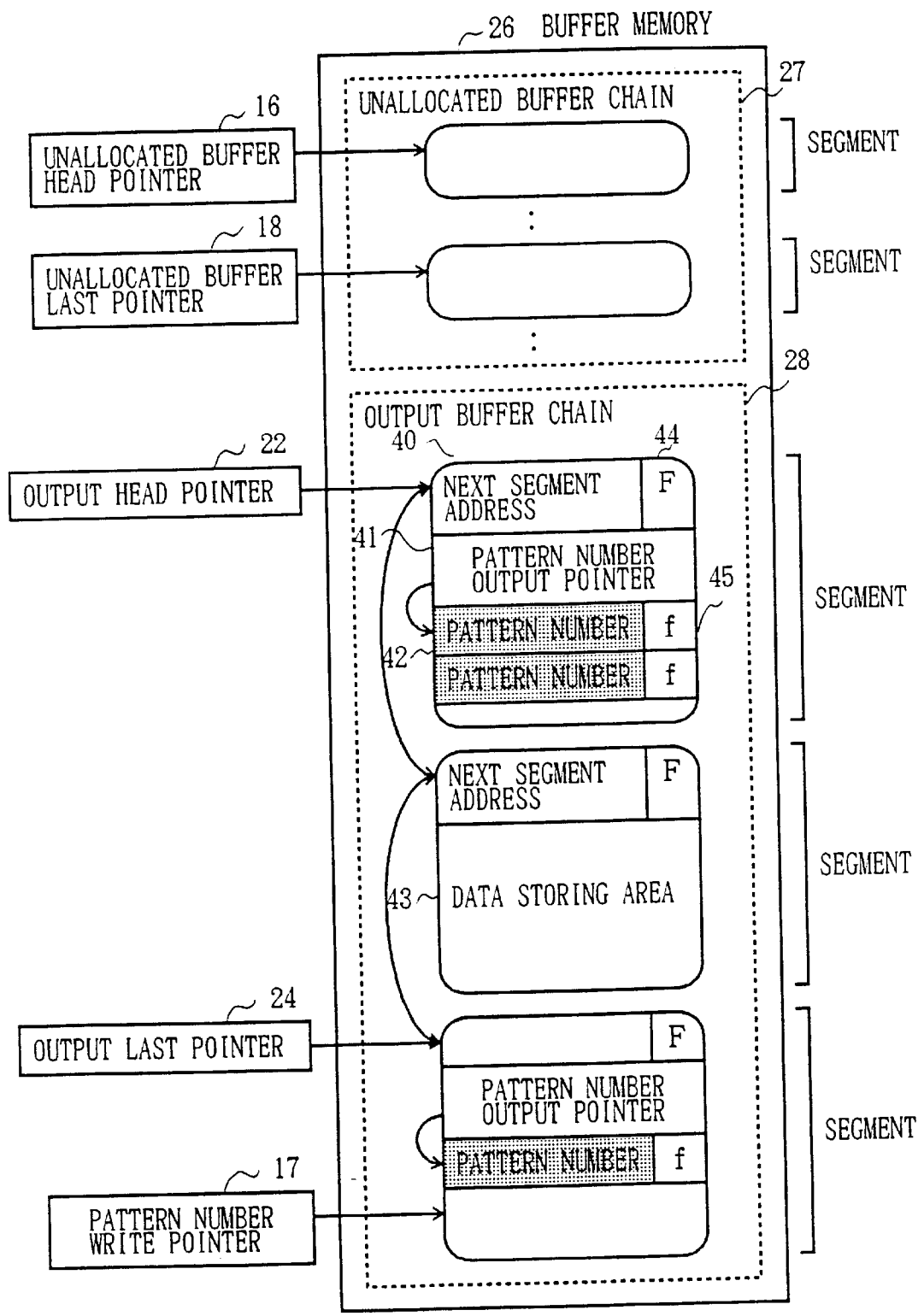
FIG. 5 is a block diagram showing the configuration of a buffer memory 26 in FIG. 4.

FIG. 5 shows the configuration of the buffer memory 26. In the following, the configuration of the buffer memory 26 and the function of each of the pointers in the buffer control part 14 will be described with reference to FIG. 5. As shown in the figure, the buffer memory 26 has an unallocated buffer chain 27 and an output buffer chain 28 each of which is formed such that data storing units, namely segments, are linked together. The unallocated buffer head pointer 16 indicates a head segment address of the unallocated buffer chain 27, and the unallocated buffer last pointer 18 indicates an end segment address of the unallocated buffer chain 27.

The pattern number write pointer 17 indicates a write address of the pattern number and the output last pointer 24 indicates the end segment address of the output buffer chain 28. A next segment address 40 in the output segment indicates an address of the next output segment. A pattern number output pointer 41 indicates the location of the pattern number which will be output next in the segment, and a pattern number is stored in a pattern number area 42. A data storing area 43 stores received data, and an identifying flag (F) 44 indicates whether the segment includes a pattern number or not. An END flag (f) 45 indicates a last pattern number in the segment and controls the unallocated buffer chain 27 and the output buffer chain 28.

FIG. 6 is a flowchart showing the operation of the first embodiment when receiving data. When the shift register 36 in the cache control part 30 receives data in step 1, the comparator 34 compares the received data with the data patterns in the pattern registers $32_0$–$32_n$ in step 2, and the data and the pattern number are sent to the pointer control part 20 in step 3. In step 4, the pointer control part 20 interprets the result of the comparison in the cache control part 30. If the result is a mishit or a mismatch, a segment in the buffer memory 26 is allocated by updating the unallocated buffer head pointer 16 in step 5. Then, the data is written in the segment and the identifying flag (F) is set to 0 in step 6. Next, the pattern number write pointer 17 is initialized by assigning the head segment address of the unallocated buffer chain 27 to the pattern number write pointer 17 in step 7. Then, the output segment chain is updated by updating the next segment address and also the output last pointer 24 is updated in step 8.

If the result of the comparison is a hit or a match in step 4, the buffer control device 10 determines whether the pattern number write pointer 17 is in an initial state or not in step 9. If it is in the initial state, the unallocated buffer head pointer 16 is updated in step 5 as mentioned above. Then, in step 10, the pattern number is written in the buffer memory 26 on the basis of an address which the pattern number write pointer 17 indicates, and the buffer control device 10 allocates 1 to the identifying flag (F) which means that the segment includes a pattern number. Next, the END flag (f) of the last pattern number in the segment is set to be 1 in step 11, and the pattern number output pointer 41 is set in step 12. In step 13, if there is any free space in the segment, the pattern number write pointer 17 is updated. If not, the pattern number write pointer 17 is initialized. Then, the output segment chain is updated in step 8 as mentioned above, and the output last pointer 24 is updated.

If the pattern number write pointer 17 is not in an initial state in step 9, the previous END flag (f) is set to be 0 in step 14 after performing step 10 and 11, and then step 13 and step 8 are performed as mentioned above.

Figure 7A:
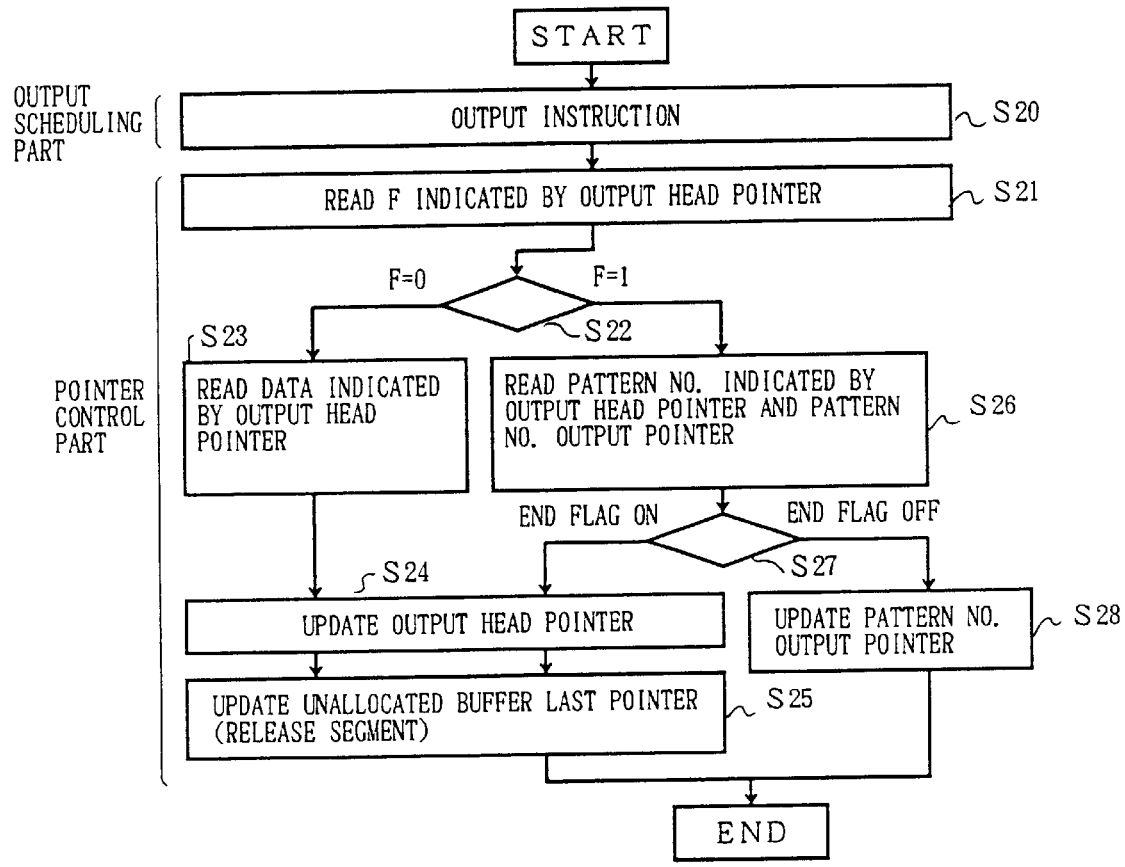
FIG. 7A is a flowchart showing the operation of a pointer control part of the buffer control device according to the first embodiment when sending data.
Figure 7B:
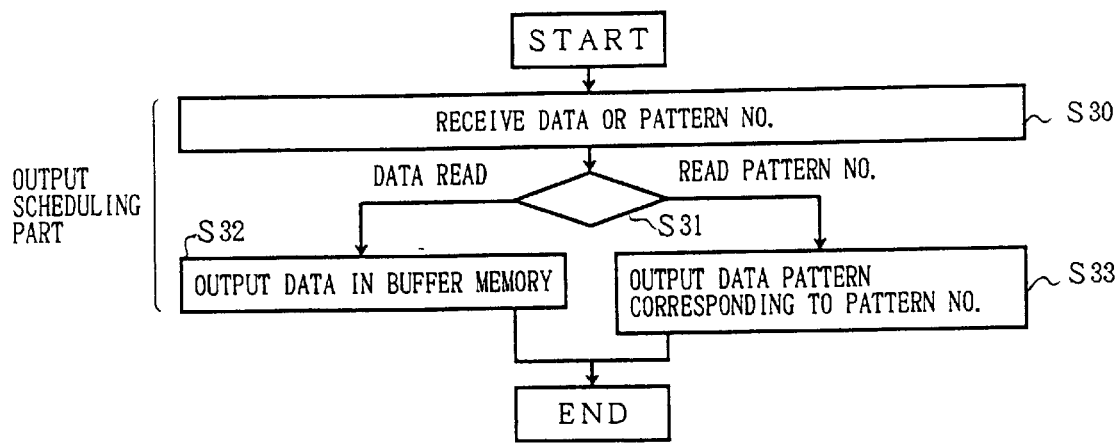
FIG. 7B is a flowchart showing the operation of an output scheduling part of the buffer control device according to the first embodiment when sending data.

FIGS. 7A and 7B are flowcharts showing the operation of the first embodiment shown in FIG. 4 when sending data. FIG. 7A mainly shows processes in the pointer control part 20, and FIG. 7B shows processes in the output scheduling part 12.

In FIG. 7A, in the case of sending data, after the output scheduling part 12 instructs the pointer control part 20 to output data in step 20, the pointer control part 20 reads the identifying flag F according to the address which is indicated by the output head pointer 22 in step 21. Then, in step 22, the pointer control part 20 determines whether there is any pattern number or not. If F equals 0, that is, if there is no pattern number, the pointer control part 20 reads data at the address which is indicated by the output head pointer 22 in step 23, and the output head pointer 22 is updated in step 24. Then, the segment is released by updating the unallocated buffer last pointer 18 in step 25.

If the pointer control part 20 determines that there is a pattern number in step 22, the pointer control part 20 reads the pattern number which is pointed to by the pattern number output pointer 41 in the segment pointed to by the output head pointer 22 in step 26. The pointer control part 20 determines whether the END flag (f) is 1 or not, in step 27. Then, if the END flag (f) is 1, the output head pointer 22 is updated in step 24 and the unallocated buffer last pointer 18 is updated in step 25 as mentioned above. If the pointer control part 20 determines that the END flag (f) is 0 in step 27, the pattern number output pointer 41 is updated in step 28.

As shown in FIG. 7B, the output scheduling part 12 receives data from the pointer control part 20 in step 30. The output scheduling part 12 determines whether the received data is real data or a pattern number in step 31. If it is real data, the data is read as it is and the data is output in step 32. If it is a pattern number, the data pattern corresponding to the pattern number is output in step 33.

Figure 8A:
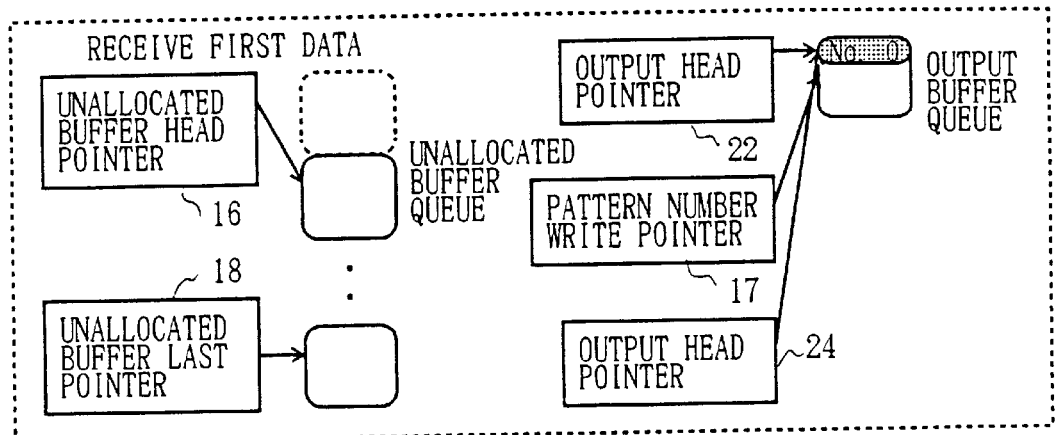
FIG. 8A is a diagram explaining a case in which first data is received in the buffer memory 26 of the buffer control device according to the first embodiment.
Figure 8B:
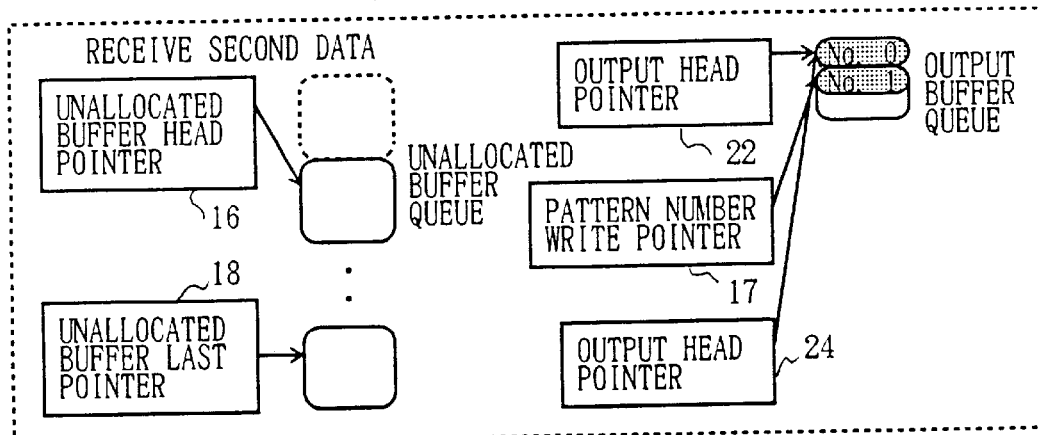
FIG. 8B is a diagram explaining a case in which second data is received in the buffer memory 26 of the buffer control device according to the first embodiment.
Figure 8C:
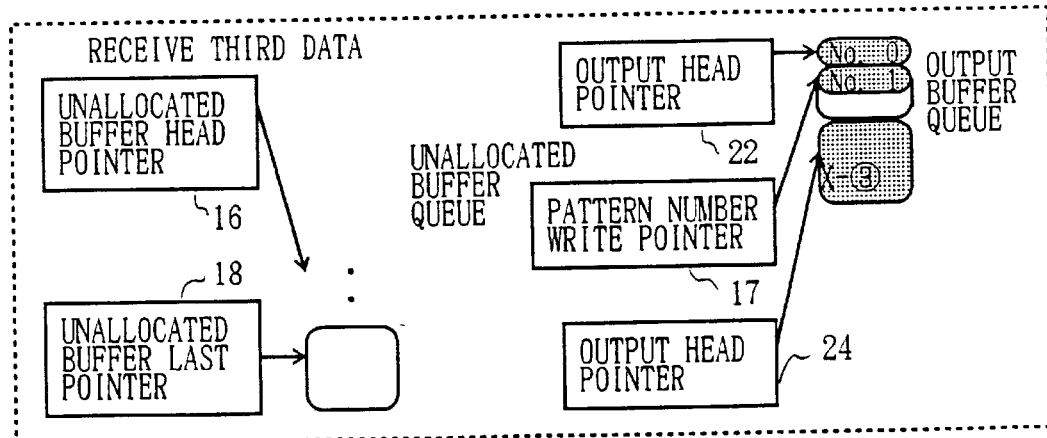
FIG. 8C is a diagram explaining a case in which third data is received in the buffer memory 26 of the buffer control device according to the first embodiment.

FIGS. 8A, 8B and 8C show an example in which the buffer control device according to the first embodiment shown in FIG. 4 receives data, more particularly, receives three sets of data in which first data is a hit, second data is also a hit, and third data is a mishit.

As shown in FIG. 8A, when the buffer control device 10 receives the first data and the data matches with a data pattern in the cache control part 30, since there is no area available for writing the pattern number indicating the data pattern in, an unallocated segment is consumed for an output segment, and the pattern number 0 is written in the output segment. At this time, the pattern number write pointer 17 points at the next address. The output head pointer 22 and the output last pointer 24 point at the output segment.

As shown in FIG. 8B, when the second data matches with a data pattern, the pattern number 1 is written in the output segment which is allocated when receiving the first data. A new unallocated segment is not consumed at this time.

As shown in FIG. 8C, since the third data does not match with any data pattern, an unallocated segment is consumed so as to store the received data (X-3) as it is. In this case, the output last pointer 24 points at the newly allocated output segment.

Figure 9:
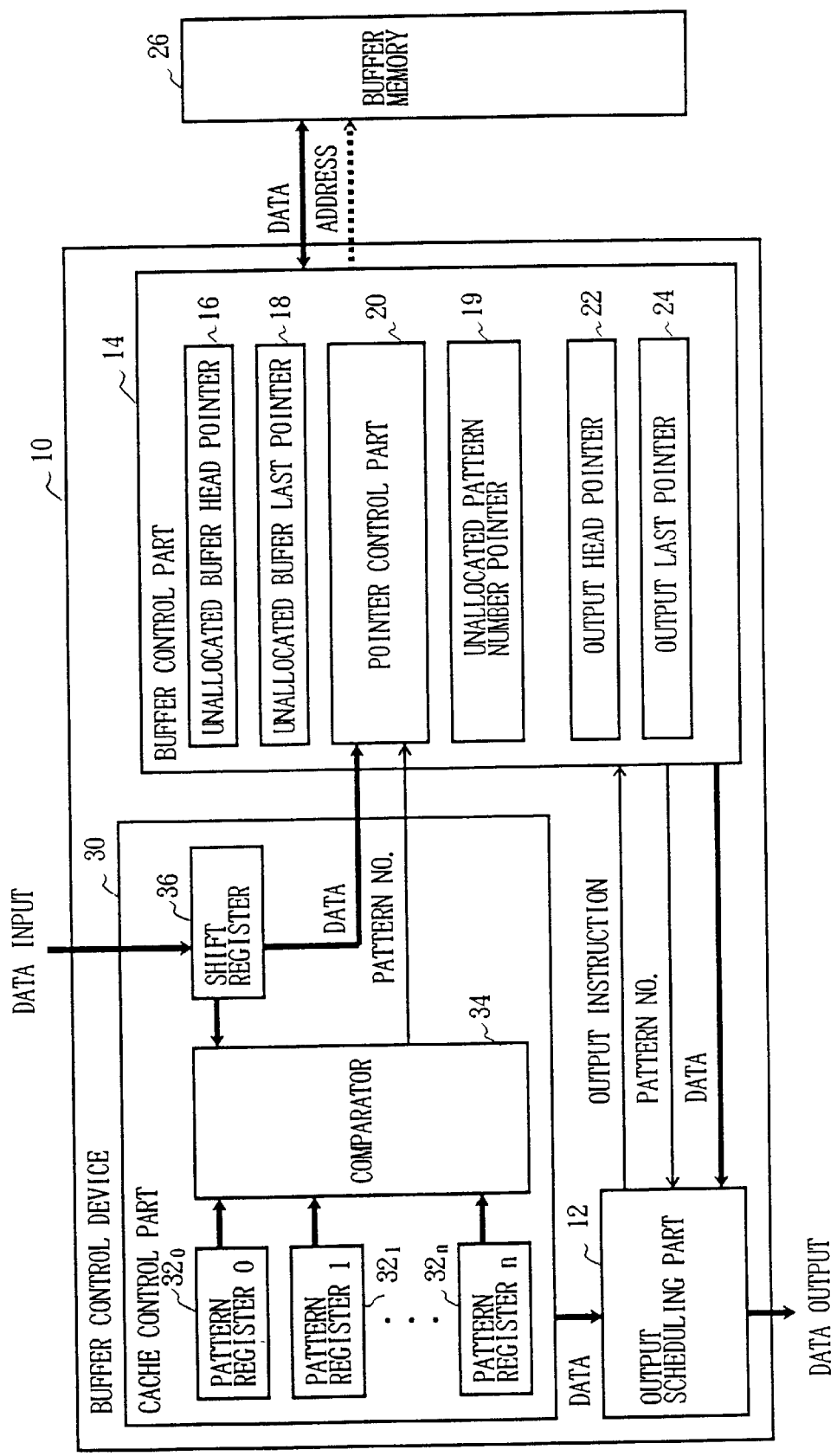
FIG. 9 is a block diagram showing the buffer control device according to a second embodiment of the present invention.

FIG. 9 is a block diagram of the buffer control device 10 according to a second embodiment of the present invention. As shown in FIG. 9, the buffer control device 10 includes, instead of the pattern number write pointer 17 as shown in FIG. 4, an unallocated pattern number pointer 19 which points at a segment address fragmented from the unallocated segment.

Figure 10:
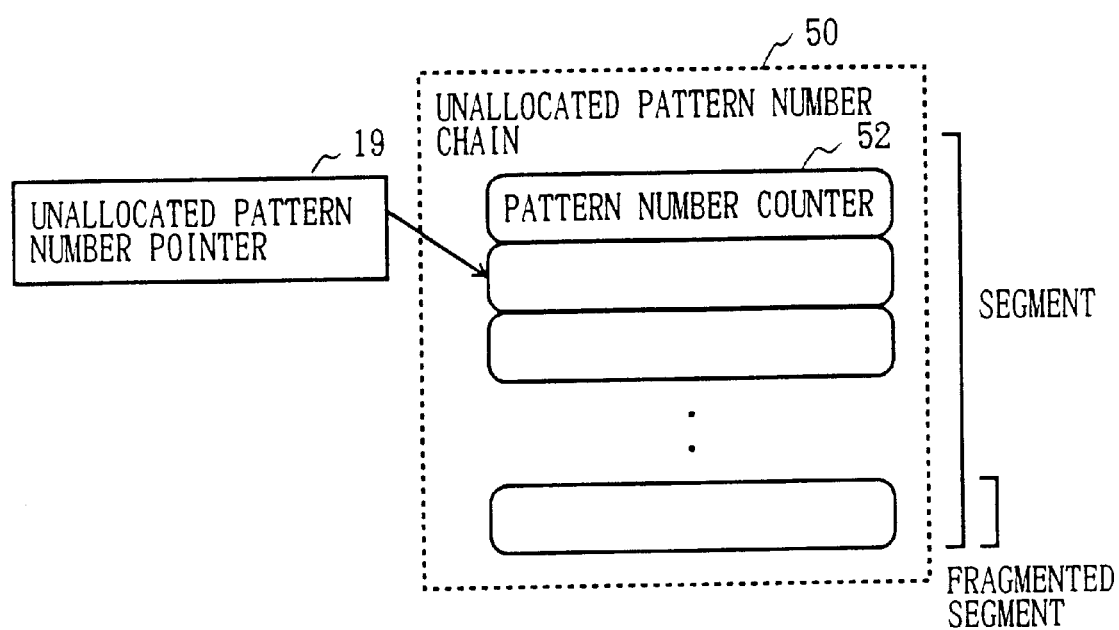
FIG. 10 is a diagram showing the configuration of an unallocated pattern number chain according to the second embodiment.

FIG. 10 shows an unallocated pattern number chain 50 including fragmented segments which are fragmented from the unallocated segment in the unallocated buffer chain 27. In the figure, a pattern number counter 52 manages allocation and release of the fragmented segment.

Figure 11:
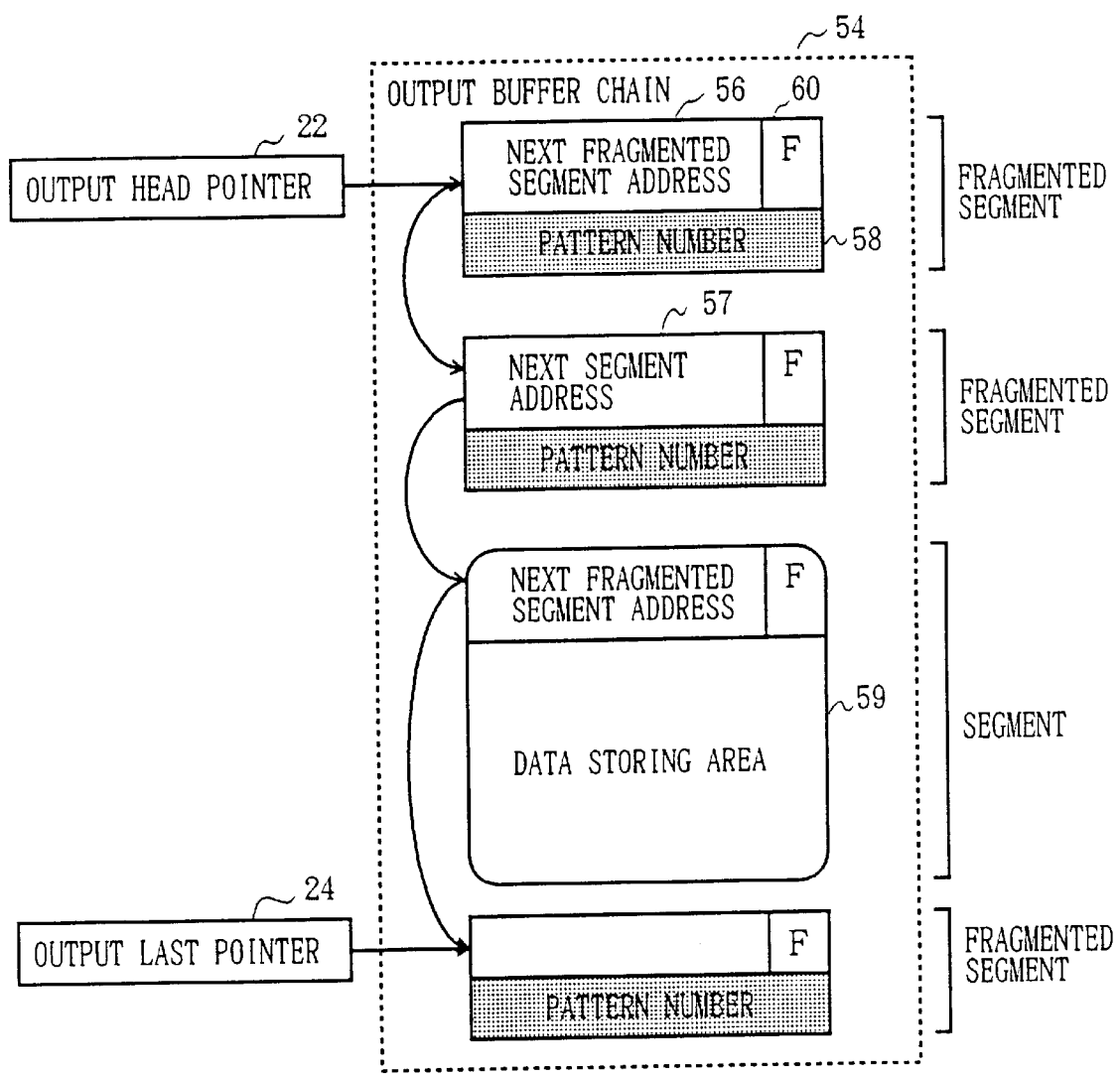
FIG. 11 is a diagram showing the configuration of an output buffer chain according to the second embodiment.

FIG. 11 shows an output buffer chain 54 including output segments and output fragmented segments. A next fragmented segment address 56 indicates the next fragmented segment, and a next segment address 57 indicates the next segment. A pattern number area 58 indicates an area for storing a pattern number, and a data storing area 59 stores received data. An identifying flag (F) 60 indicates that the segment or the fragmented segment includes a pattern number or not, and is used for controlling the unallocated buffer chain 27, the unallocated pattern number chain 50 and the output buffer chain 54. The output head pointer 22 points at the head of the output segment or the output fragmented segment, and the output last pointer 24 points at the end of the output segment or the output fragmented segment. The unallocated pattern number pointer 19 can be formed by a FF circuit or a memory.

Figure 12:
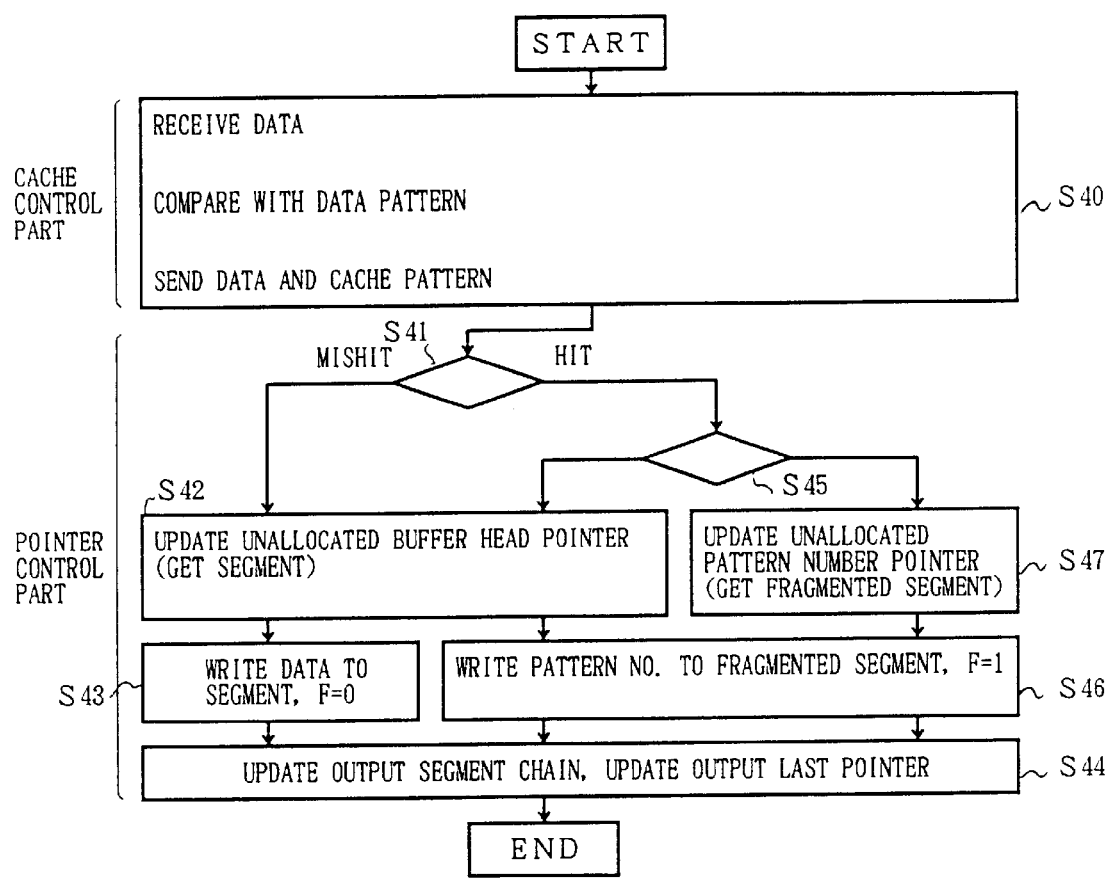
FIG. 12 is a flowchart showing the operation of the buffer control device according to the second embodiment when receiving data.

FIG. 12 is a flowchart showing the operation of the buffer control device 10 according to the second embodiment shown in FIG. 9 when receiving data. The cache control part 30 performs the same steps as the steps 1–3 as shown in FIG. 6 in step 40. Then, the pointer control part 20 receives cached data in step 41, and interprets the result of matching in the cache control part 30. If the result is a mishit, a new segment is allocated by updating the unallocated buffer head pointer 16 in step 42, and, then the pointer control part 20 writes the received data in the segment and sets the identifying flag (F) to 0 in step 43. Next, the output segment chain and the output last pointer 24 are updated in step 44.

If the result is a hit in step 41, the pointer control part 20 determines whether the unallocated pattern number chain 50 has a free space or not. If there is no free space, the unallocated buffer head pointer 16 is updated in step 42 as mentioned above. Then, the pointer control part 20 writes the pattern number in the fragmented segment, sets the identifying flag (F) to 1 in step 46, and updates the output segment chain and the output last pointer 24 in step 44.

If there is free space as a result of step 45, the pointer control part 20 reserves a new unallocated fragmented segment by updating the unallocated pattern number pointer 19 in step 47. Then, the pointer control part 20 writes the pattern number in the fragmented segment, sets the identifying flag (F) to 1 in step 46, and updates the output segment chain and the output last pointer in step 44.

Figure 13A:
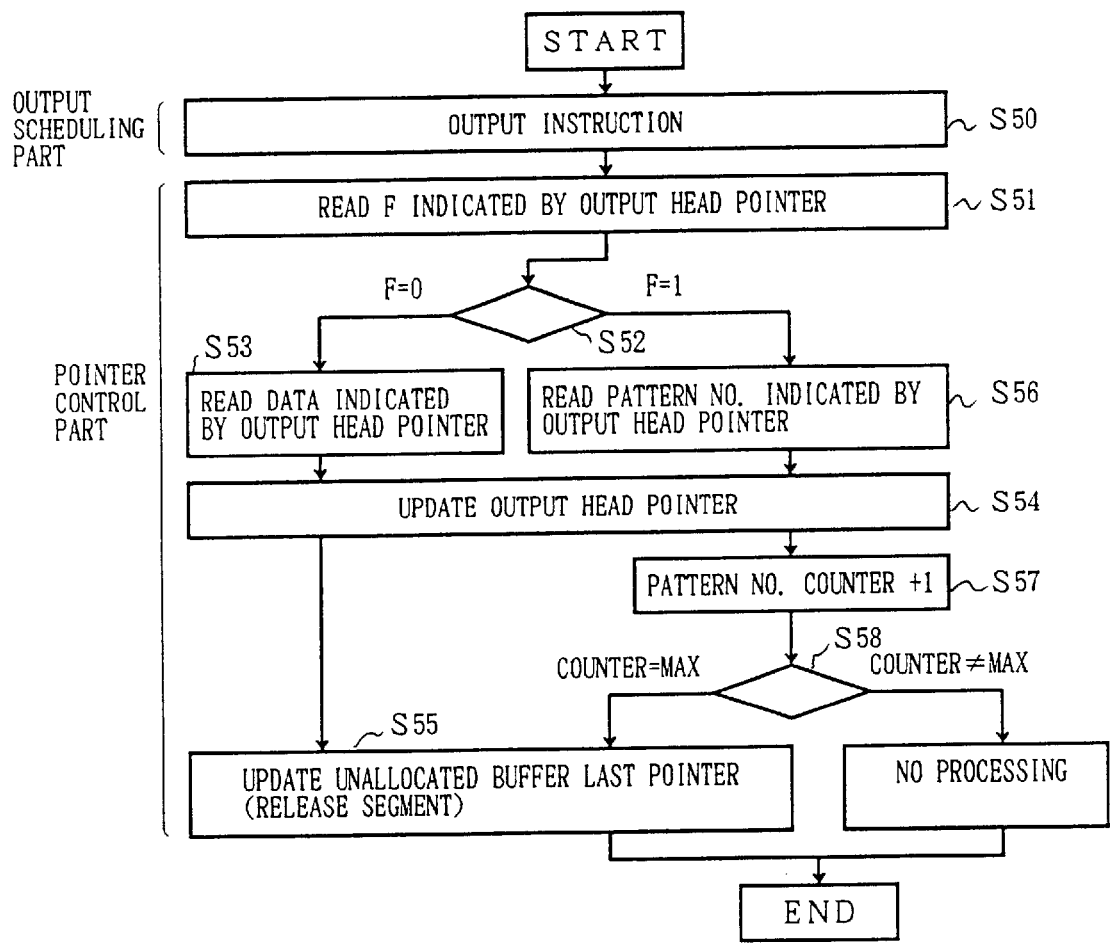
FIG. 13A is a flowchart showing the operation of the pointer control part of the buffer control device according to the second embodiment when sending data.
Figure 13B:
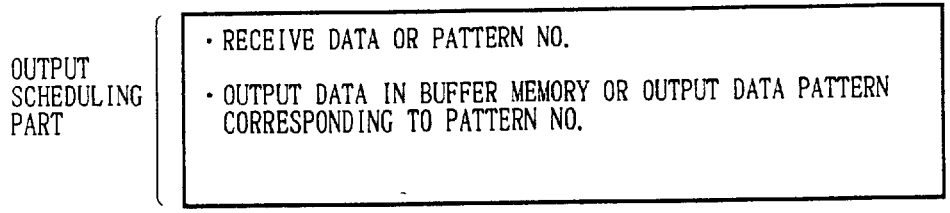
FIG. 13B is a flowchart showing the operation of the output scheduling part of the buffer control device according to the second embodiment when sending data.

FIGS. 13A and 13B are flowcharts showing the operation of the buffer control device 10 according to the second embodiment shown in FIG. 9 when sending data. FIG. 13A mainly shows processes in the pointer control part 20, and FIG. 13B shows processes in the output scheduling part 12.

As shown in FIG. 13A, after the output scheduling part 12 instructs the pointer control part 20 to output data in step 50, the pointer control part 20 reads the flag F according to the address indicated by the output head pointer 22 in step 51. Then, the pointer control part 20 determines whether the data is a pattern number or not in step 52. If the data is not a pattern No., that is, if F equals 0, the data is read in step 53. Then, the pointer control part 20 updates the output head pointer 22 in step 54, and releases the segment by updating the unallocated buffer last pointer 18 in step 55.

If the pointer control part 20 determines that the data is a pattern number in step 52, the pointer control part 20 reads the pattern number which has an address pointed to by the output head pointer 22 in step 56, and updates the output head pointer 22. Next, the fragmented segment is released by incrementing the pattern number counter 52 by 1. The pointer control part 20 determines whether the pattern number counter 52 indicates a maximum value or not. If it indicates a maximum value, the segment is released by updating the unallocated buffer last pointer 18 in step 55. If not, no processing such as updating is performed.

As shown in FIG. 13B, the output scheduling part 12 receives data from the pointer control part 20, then determines whether the data is real data or a pattern number. In the case of the real data, the data is read as it is, and is output. In the case of a pattern number, a data pattern corresponding to the pattern number is output from the output scheduling part 12.

Figure 14A:
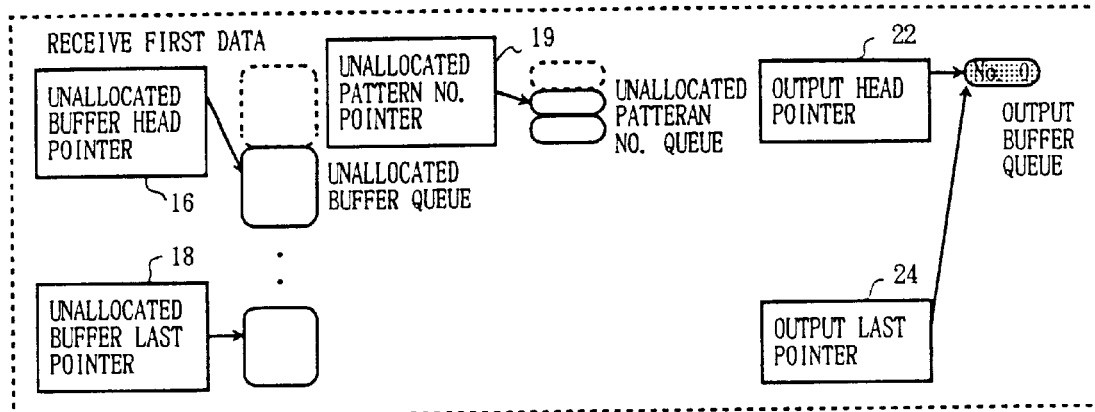
FIG. 14A is a diagram explaining a case in which first data is received in the buffer memory of the buffer control device according to the second embodiment.
Figure 14B:
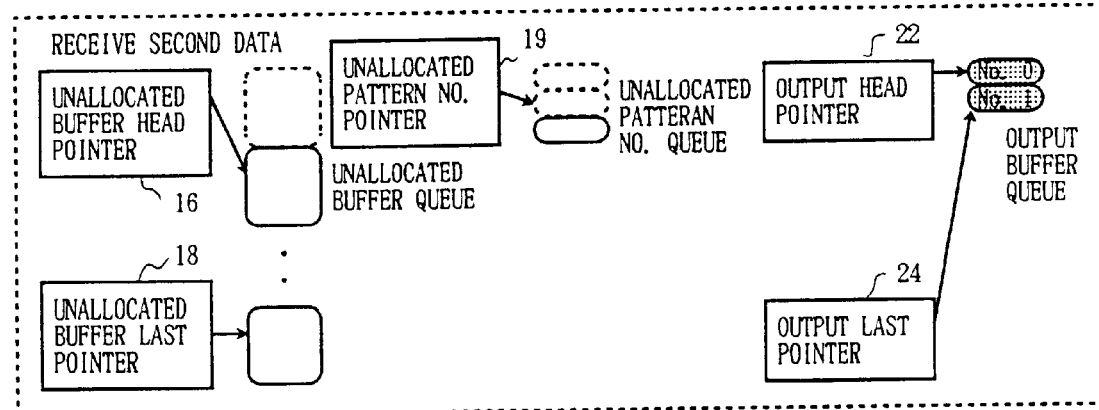
FIG. 14B is a diagram explaining a case in which second data is received in the buffer memory of the buffer control device according to the second embodiment.
Figure 14C:
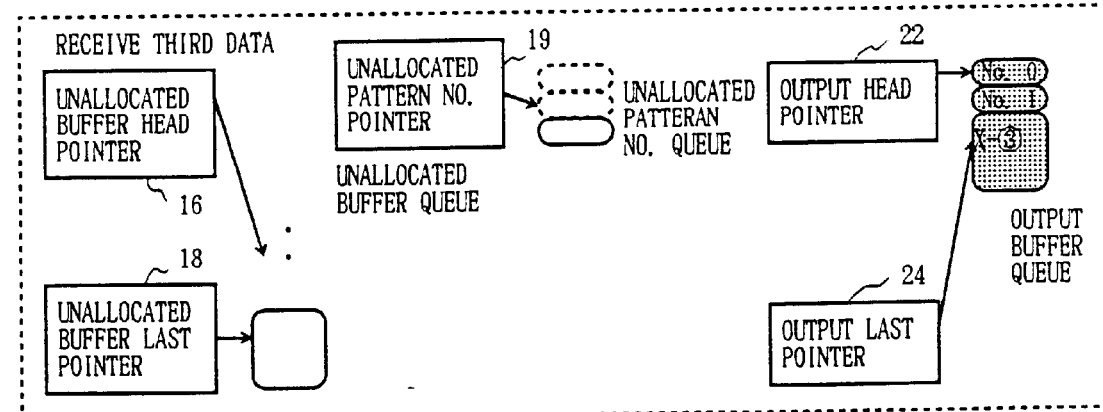
FIG. 14C is a diagram explaining a case in which third data is received in the buffer memory of the buffer control device according to the second embodiment.

FIGS. 14A, 14B and 14C show an example in which the buffer control device 10 according to the second embodiment shown in FIG. 9 receives data, more particularly, receives three sets of data in which first data is a hit, second data is also a hit, and third data is a mishit.

As shown in FIG. 14A, when the buffer control device 10 receives the first data and the data matches with a data pattern in the cache control part 30, since there is no area available for writing the pattern number, an unallocated segment is consumed and is fragmented, and then a pattern number 0 is written in the fragmented segment. At this time, the unallocated pattern number pointer 19 points at the next address in the unallocated pattern number queue.

As shown in FIG. 14B, when the second data matches with a data pattern, a fragmented segment is consumed from the unallocated pattern number queue in the output segment, and a pattern number 1 is written in the fragmented segment.

As shown in FIG. 14C, since the third data does not match with any data pattern, an unallocated segment is consumed so as to store the received data (X-3) as it is. The remaining fragmented segment in the unallocated pattern number queue is available for a next hit.

Figure 15:
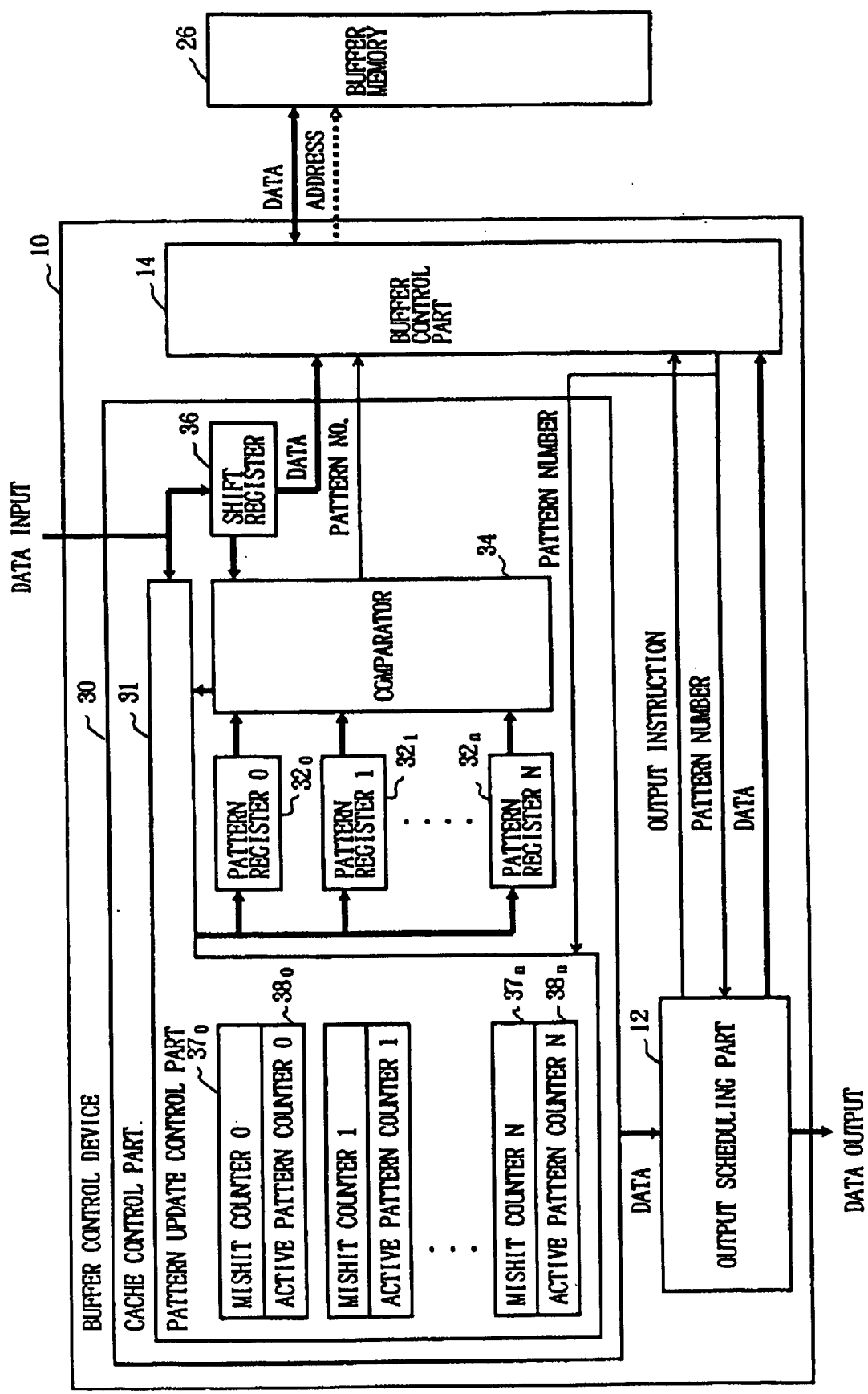
FIG. 15 is a block diagram showing the buffer control device according to a third embodiment of the present invention.

FIG. 15 is a block diagram showing the buffer control device 10 according to a third embodiment of the present invention. As shown in this figure, the third embodiment is formed such that a pattern update control part 31 is added to the cache control part 30 shown in FIG. 4 or FIG. 9. Each of mishit counters $37_0$–$37_n$ counts the number of mismatches as a result of comparing received data with each of pattern data. Each of active pattern counters $38_0$–$38_n$ counts the number of chained pattern numbers. in the output buffer, that is, the number of the pattern numbers. which are being used. Depending on the mishit counters $37_0$–$37_n$, a data pattern in a pattern register is rewritten if the data pattern hardly matches with received data. However, if the active pattern counter corresponding to the data pattern indicates that the pattern data is being used, the pattern data is not rewritten. Each of the mishit counters $37_0$–$37_n$ and the active pattern counters $38_0$–$38_n$ can be formed by a FF circuit or a memory.

Alternatively, each of the mishit counters $37_0$–$37_n$ may be a counter which counts the number of matches. Further, the data pattern which should be rewritten may be determined, for example, by establishing a threshold which will be compared with the content of each of the counters $37_0$–$37_n$.

Figure 16:
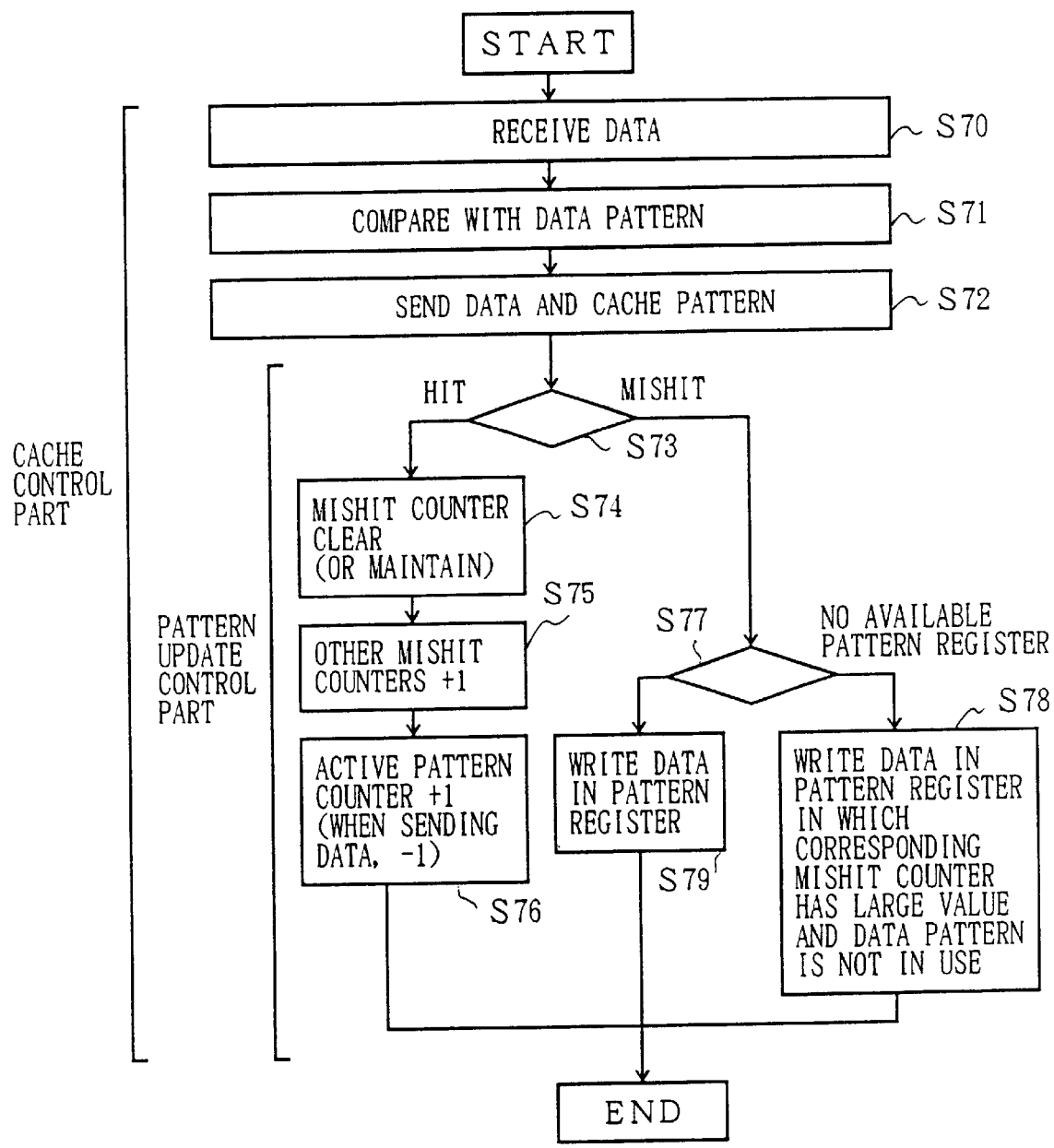
FIG. 16 is a flowchart showing the operation of the buffer control device according to the third embodiment when receiving data.

FIG. 16 is a flowchart showing the operation of the cache control part 30 of the buffer control device 10 according to the third embodiment of the present invention shown in FIG. 15 when receiving data.

The same steps as the steps 1–3 shown in FIG. 6 are performed in the cache control part 30 as steps 70–72. Then, the pattern update control part 31 interprets the result of comparison between received data and the data patterns in step 73. If the result is a hit, the mishit counter corresponding to the hit data pattern is cleared or maintained in step 74, and other mishit counters are incremented in step 75. Then, the active pattern counter corresponding to the hit data pattern is incremented in step 76.

As a result of the interpretation in step 73, if none of the data patterns match with the received data, the pattern update control part 31 determines whether or not there is an available pattern register having no data among the pattern registers $32_0$–$32_n$. If there is not an available pattern register, the pattern update control part 31 rewrites new data into a pattern register in which the content in the corresponding mishit counter is a large value and the data pattern is not in use in step 78. If there is an available pattern register in step 77, new pattern data is written in the pattern register in step 79.

Figure 17A:
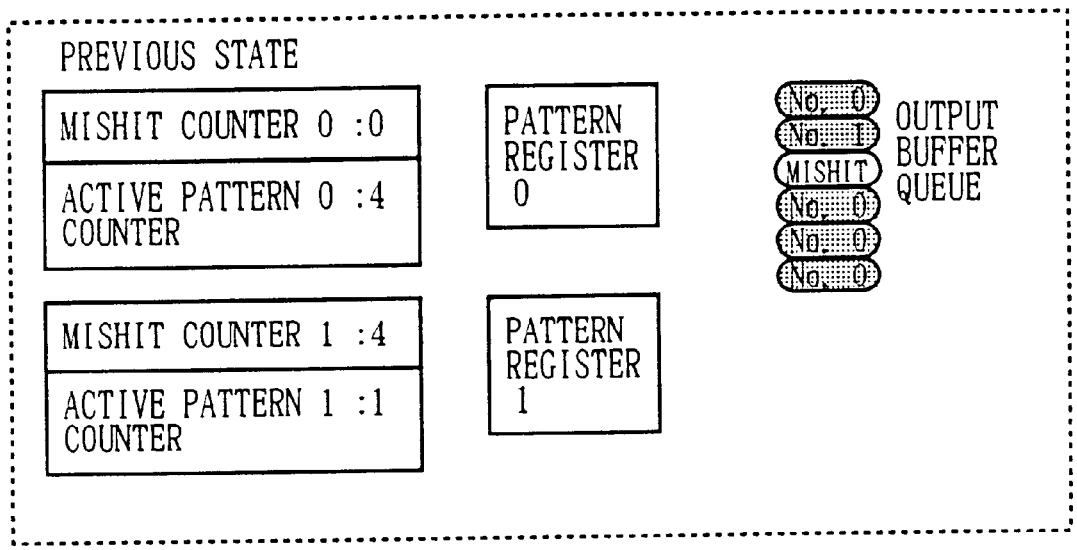
FIG. 17A is a diagram explaining a case in which pattern data is updated showing a previous state.
Figure 17B:
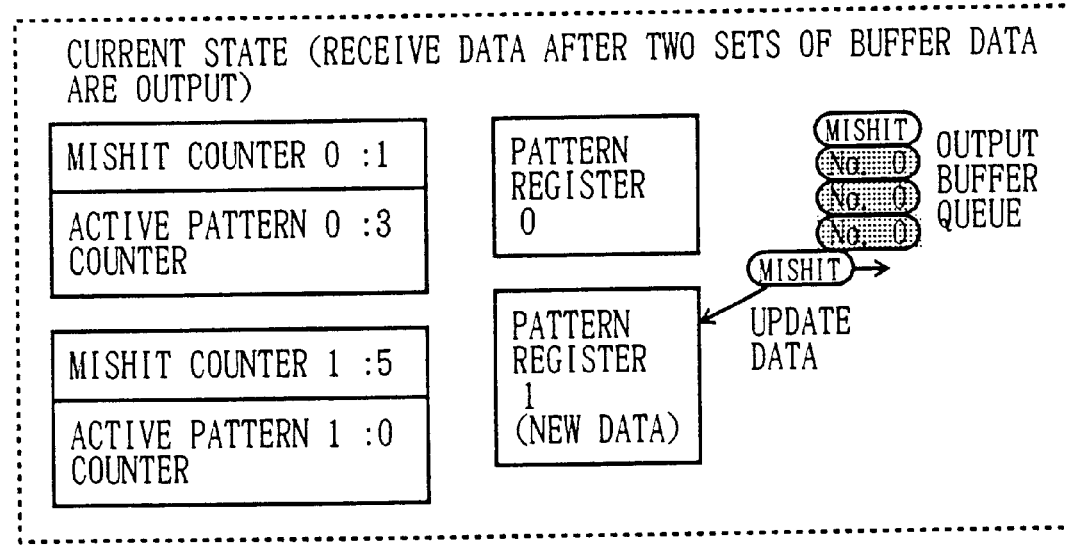
FIG. 17B is a diagram explaining a case in which pattern data is updated showing a current state after outputting two sets of buffer data.

FIGS. 17A and 17B show a state change of the mishit counter, the active pattern counter, the pattern register, and the output buffer queue.

As shown in FIG. 17A which shows a previous state, the content of the mishit counter 1 is 4, which is relatively large. Then, as shown in FIG. 17B which shows a current state in which mishit data is received after two sets of buffer data have been output since the previous state, new pattern data is written in the pattern register 1 in which the corresponding mishit counter value is large and the corresponding active pattern counter value is 0.

Figure 18:
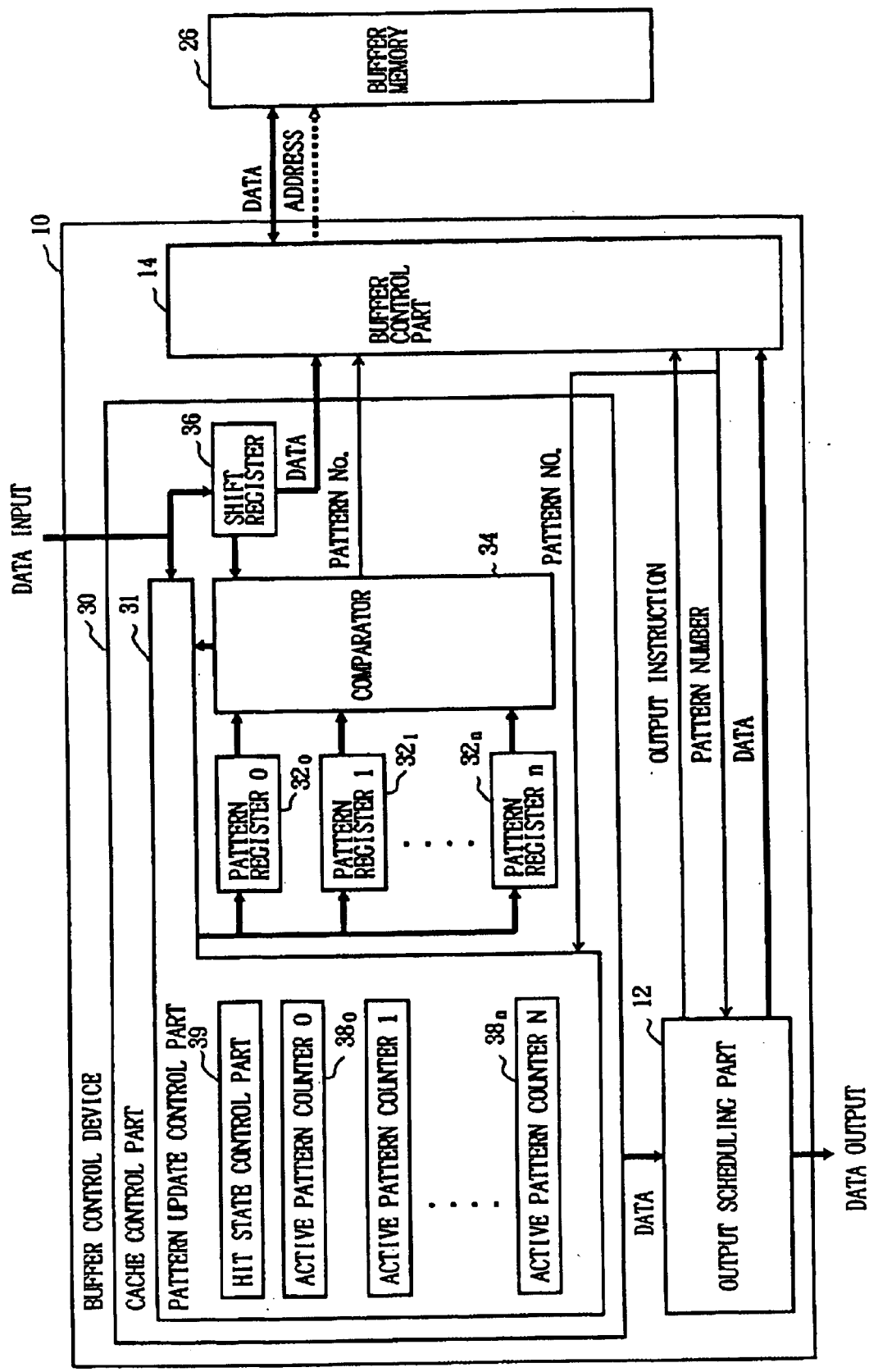
FIG. 18 is a block diagram showing the buffer control device according to a fourth embodiment of the present invention.

FIG. 18 is a block diagram of the buffer control device 10 according to a fourth embodiment of the present invention. As shown in FIG. 18, this embodiment is formed such that another pattern update control part 31 is added to the cache control part 30 in the configuration shown in FIG. 4 or FIG. 9.

According to this embodiment, the pattern update control part 31 includes a hit state control part 39 which assigns priorities to the data patterns, and the active pattern counters $38_0$–$38_n$. The hit state control part 39 assigns priorities to data patterns in the pattern registers $32_0$–$32_n$ such that a low priority data pattern is replaced by a new one. The hit state control part 39 can be formed, for example, by hardware logic or a software program.

Figure 19:
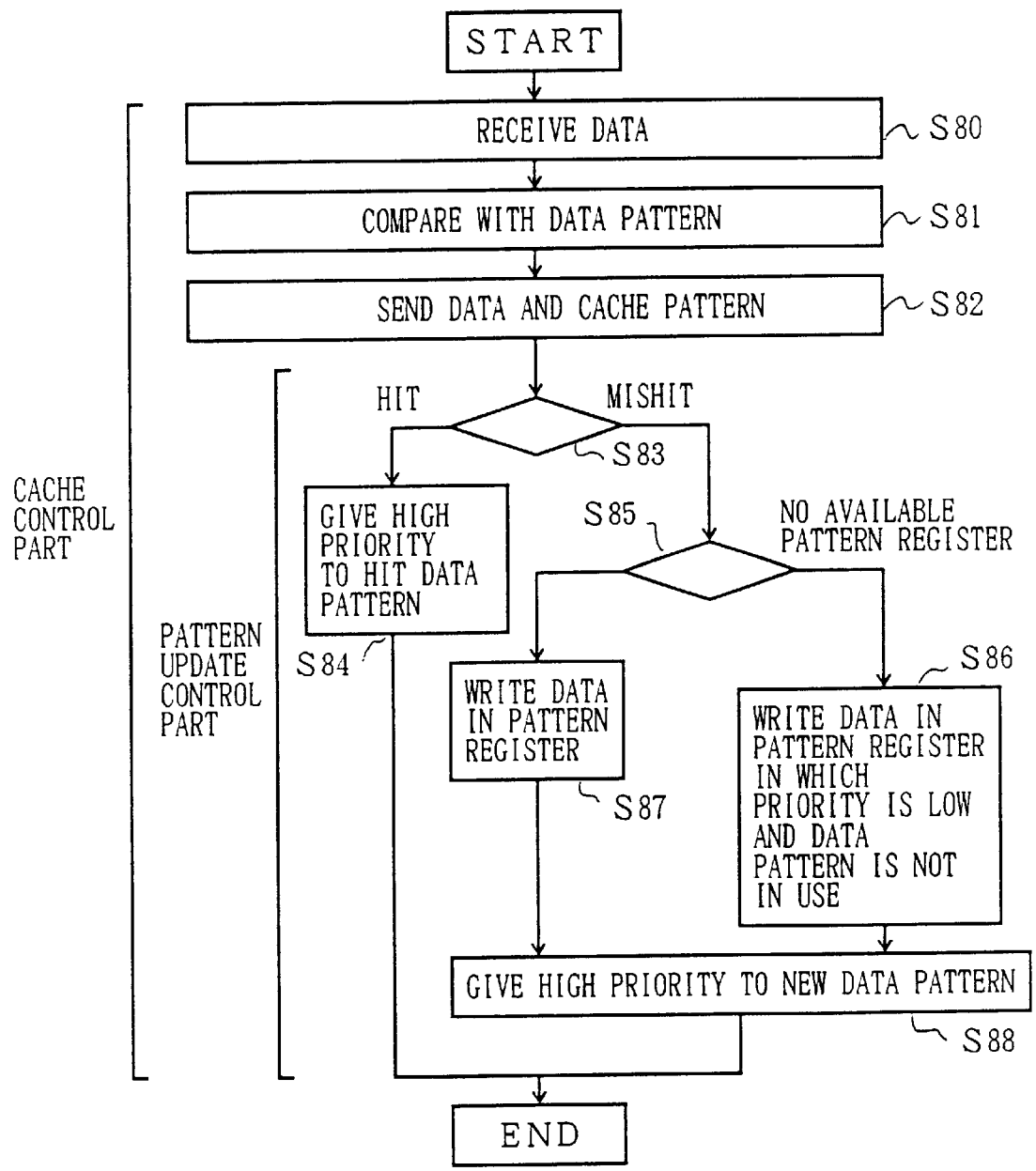
FIG. 19 is a flowchart showing the operation of the buffer control device according to the fourth embodiment when receiving data.

FIG. 19 is a flowchart showing the operation of the buffer control device 10 according to the fourth embodiment shown in FIG. 18 when receiving data.

The same steps as the steps 1–3 shown in FIG. 6 are performed in the cache control part 30 as steps 80–82. Next, the pattern update control part 31 interprets the result of the comparison between received data and the data patterns in step 83. If the result is a hit, the priority of the pattern register corresponding to the data pattern is changed to a higher one in step 84.

As a result of the interpretation in step 83, if none of the data patterns match with the received data, the pattern update control part 31 determines whether or not there is an available pattern register having no data among the pattern registers $32_0$–$32_n$ in step 85. If there is not an available pattern register, the pattern update control part 31 rewrites new data into a pattern register in which the priority is low and the data pattern is not in use in step 86. Then, a high priority is assigned to the new data in step 88. If there is an available pattern register in step 85, new pattern data is written in this unused pattern register in step 87 and a high priority is assigned to the new data in step 88.

Figure 20:
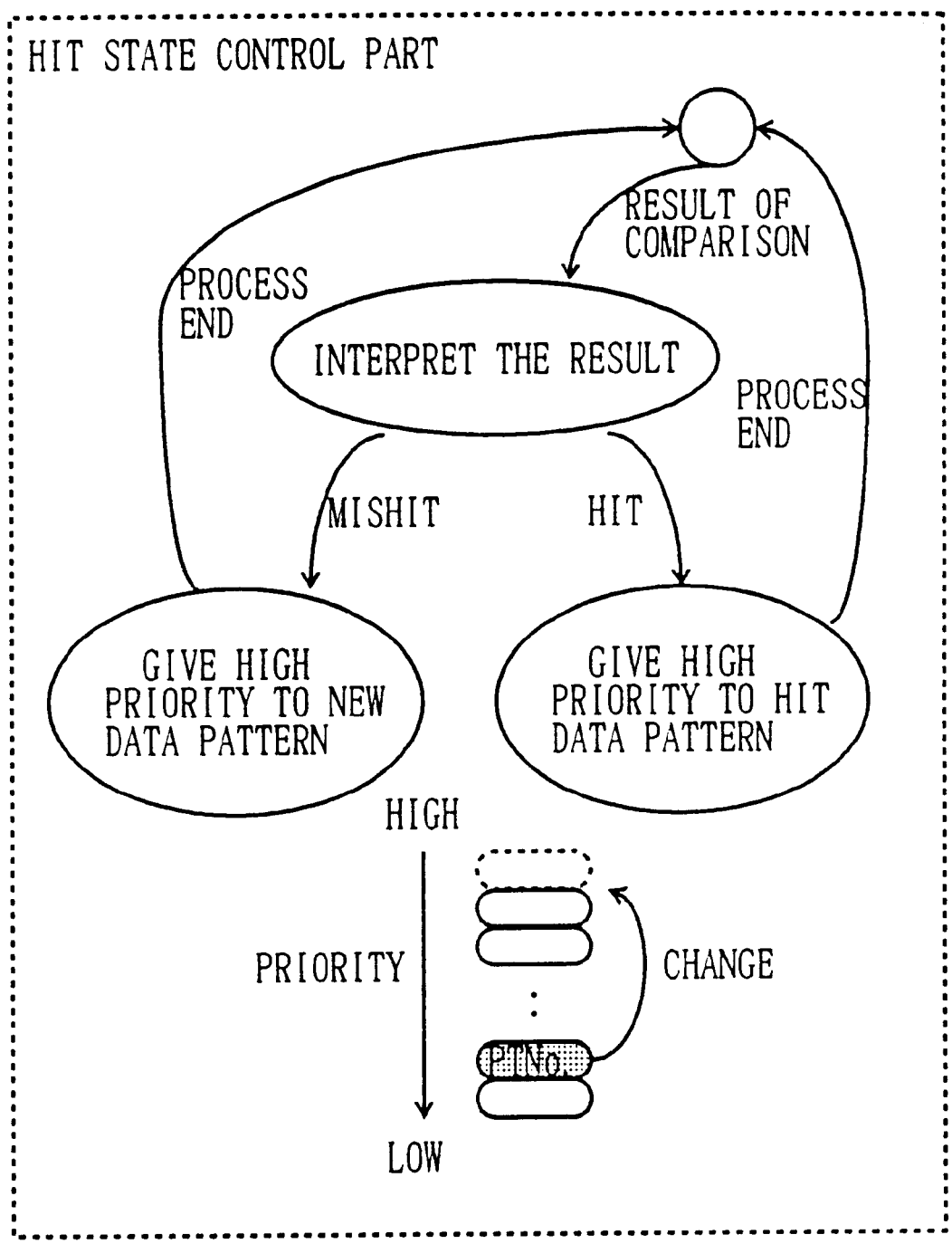
FIG. 20 is a diagram showing the changing procedure of the order of priority.

FIG. 20 shows state changes of the data pattern in the above-mentioned hit state control part 39.

Figure 21A:
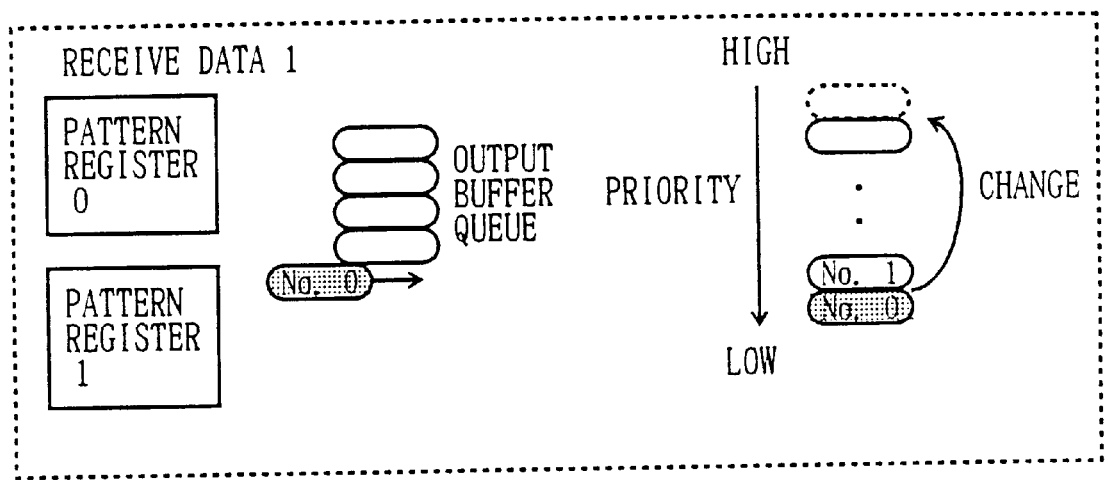
FIG. 21A is a diagram explaining a case in which pattern data is updated according to the fourth embodiment.
Figure 21B:
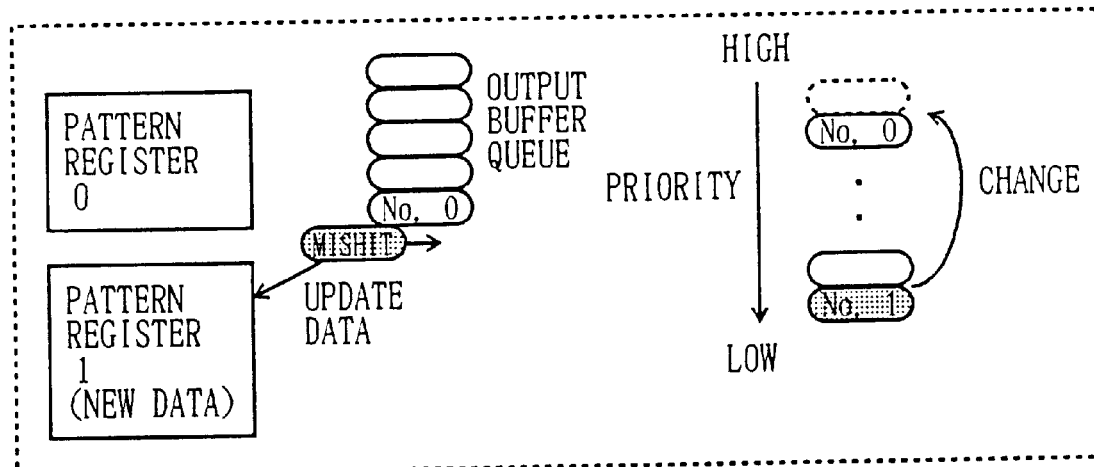
FIG. 21B is a diagram explaining a case in which pattern data is updated according to the fourth embodiment.

FIGS. 21A and 21B show an example of the state change of a data pattern. As shown in FIG. 21A, when the buffer control device 10 receives first data which matches with a data pattern in the pattern register 0, the priority of the pattern register 0 changes to a higher level and the priority of the patter register 1 changes to a lower level.

As shown in FIG. 21B, when the buffer control device 10 receives second data which does not match any data pattern, the data pattern 1 which has a low priority level is replaced by new data, which is assigned a high priority.

Figure 22:
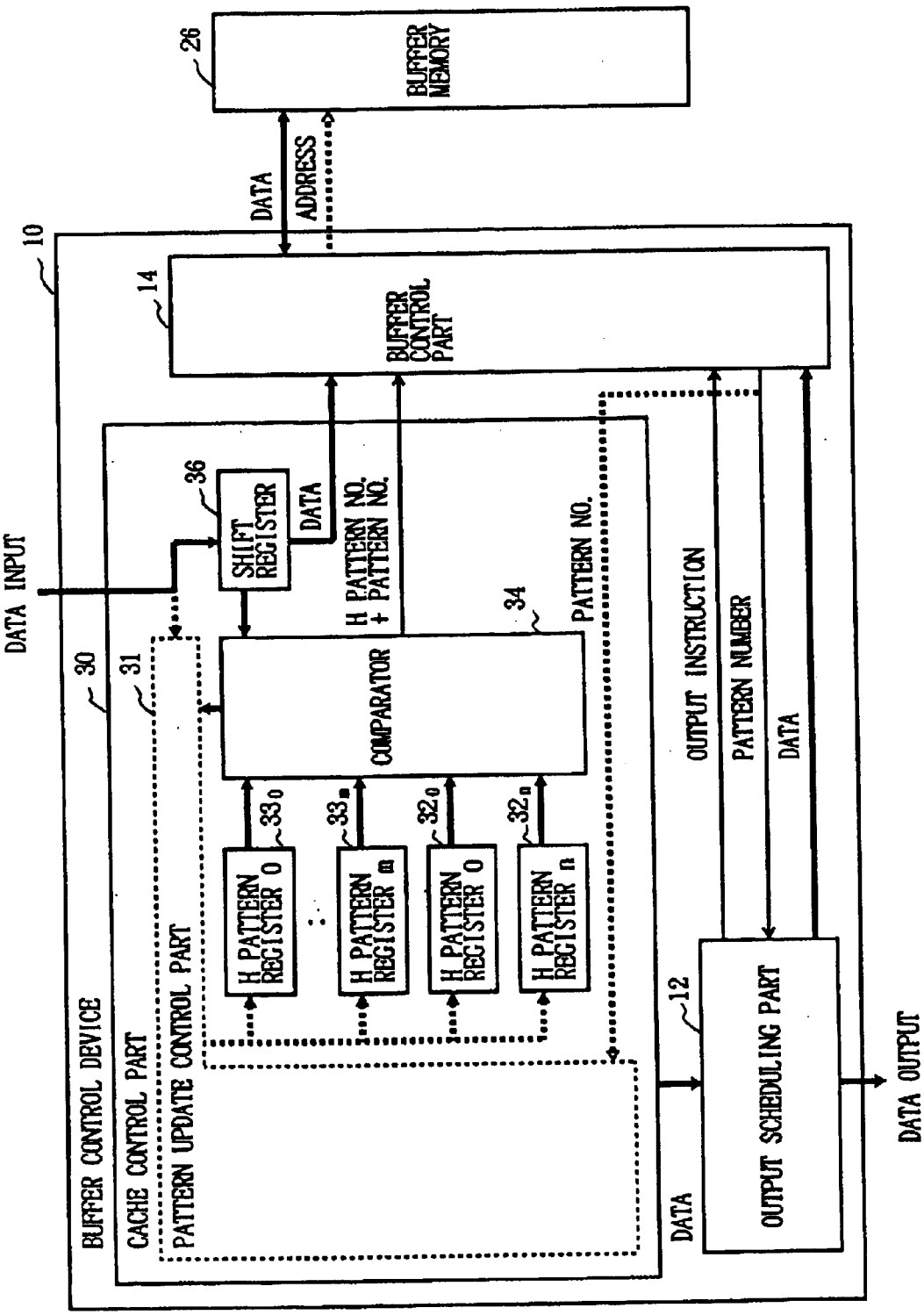
FIG. 22 is a block diagram showing the buffer control device according to a fifth embodiment of the present invention.

FIG. 22 is a block diagram of the buffer control device 10 according to a fifth embodiment of the present invention.

As shown in FIG. 22, the buffer control device 10 is formed such that H pattern registers $33_0$–$33_m$ are added to the configuration shown in FIG. 15 or FIG. 18. Each of the H pattern registers $33_0$–$33_m$ is provided for comparing data patterns with a part of received data, and each of the pattern registers $32_0$–$32_m$ is provided for comparing data patterns with the remaining part of the received data. Here, the H pattern register may store a header part of the received data. The combination of the results of the comparison is sent to the buffer control part 14. Each of the H pattern registers $33_0$–$33_m$ and the pattern registers $32_0$–$32_m$ can be formed by a FF circuit or a memory. The number of times of data splitting may be more than three.

Figure 23:
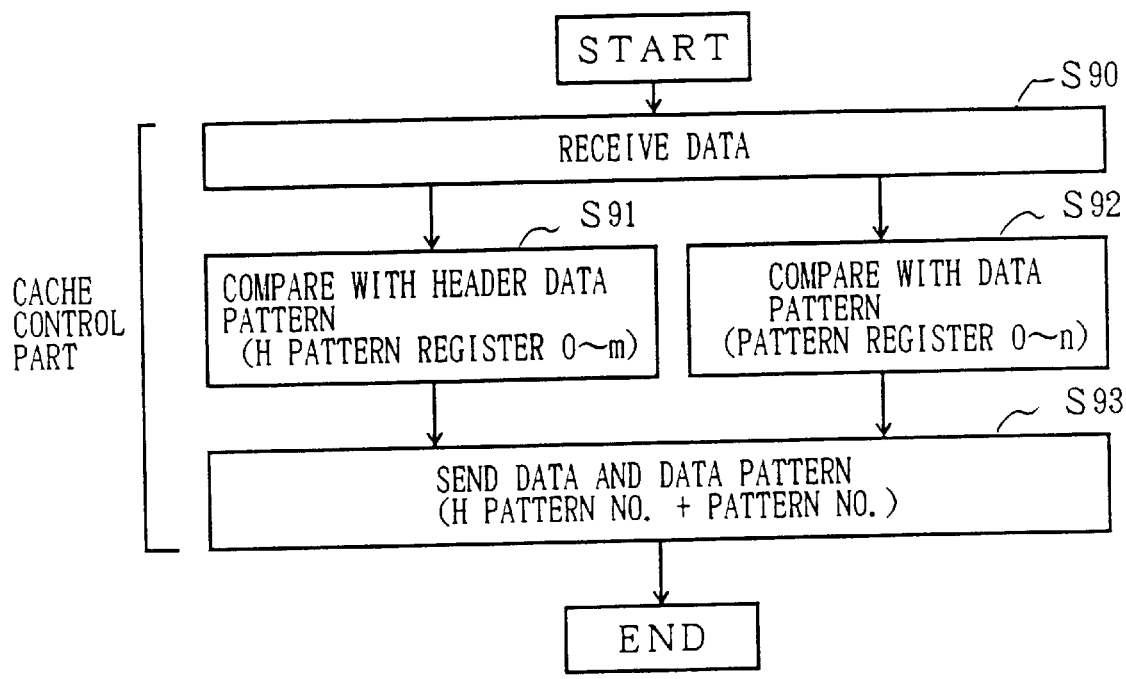
FIG. 23 is a flowchart showing the operation of the buffer control device according to the fifth embodiment when receiving data.

FIG. 23 is a flowchart showing the operation of the cache control part 30 according to the fifth embodiment shown in FIG. 22 when receiving data. As shown in FIG. 23, after the cache control part 30 receives data in step 90, each set of pattern data in the H pattern register and the pattern register are compared with a part of the received data and the remaining part of the received data in step 91 and 92, respectively. Then, the result is sent to the buffer control part 14 in step 93.

Figure 24:
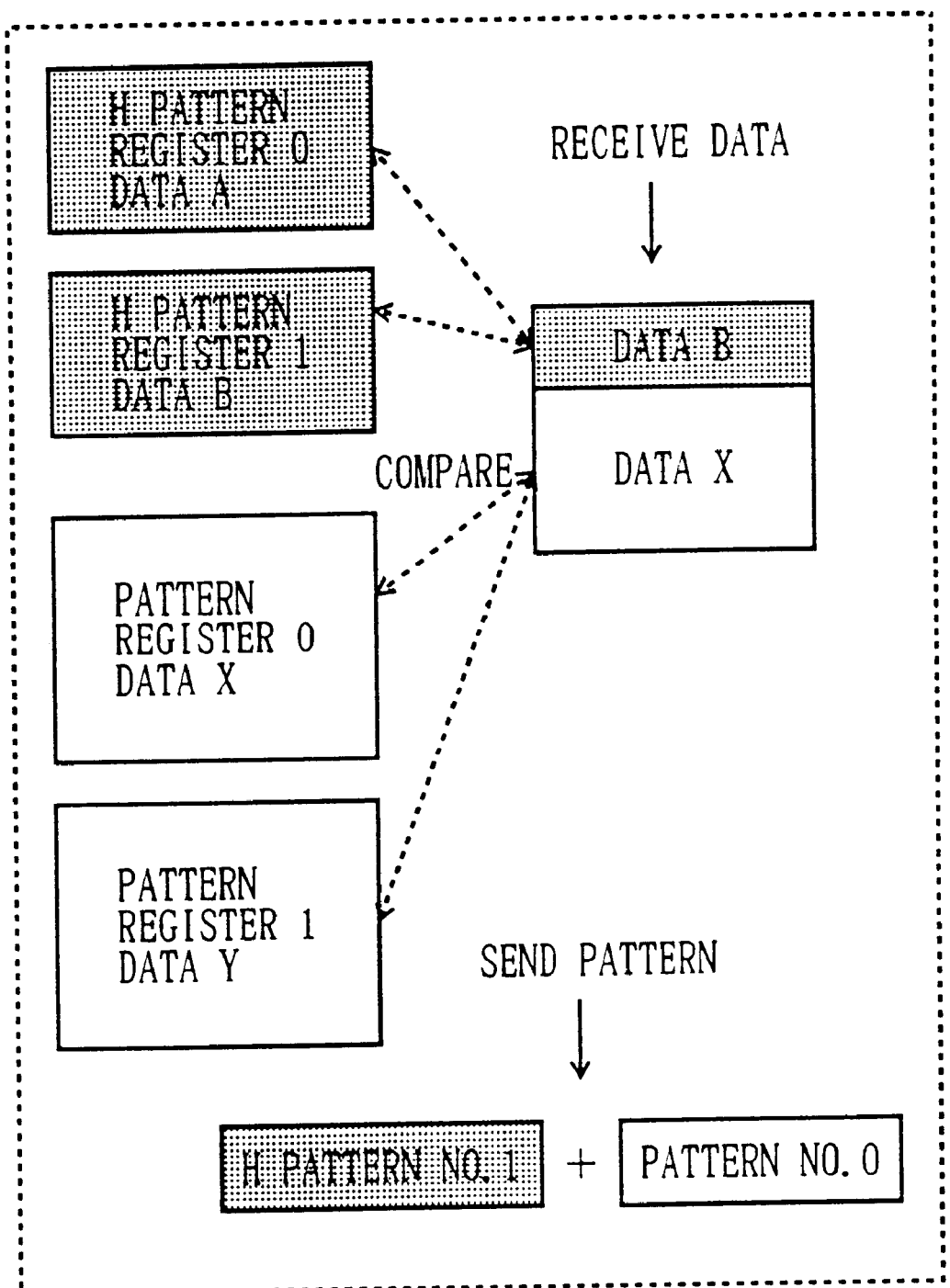
FIG. 24 is a diagram explaining a case in which each of split data is compared with pattern data.

FIG. 24 shows an example in which the cache control part 30 receives data which includes data B and data X. As shown in FIG. 24, the received data has the data B and data X. The data B is compared with the data patterns in the H pattern registers and the data X is compared with the data patterns in the pattern registers. In this case, since both of the data B and X are matched, the H pattern number 1 and the pattern number 0 are sent.

Figure 25:
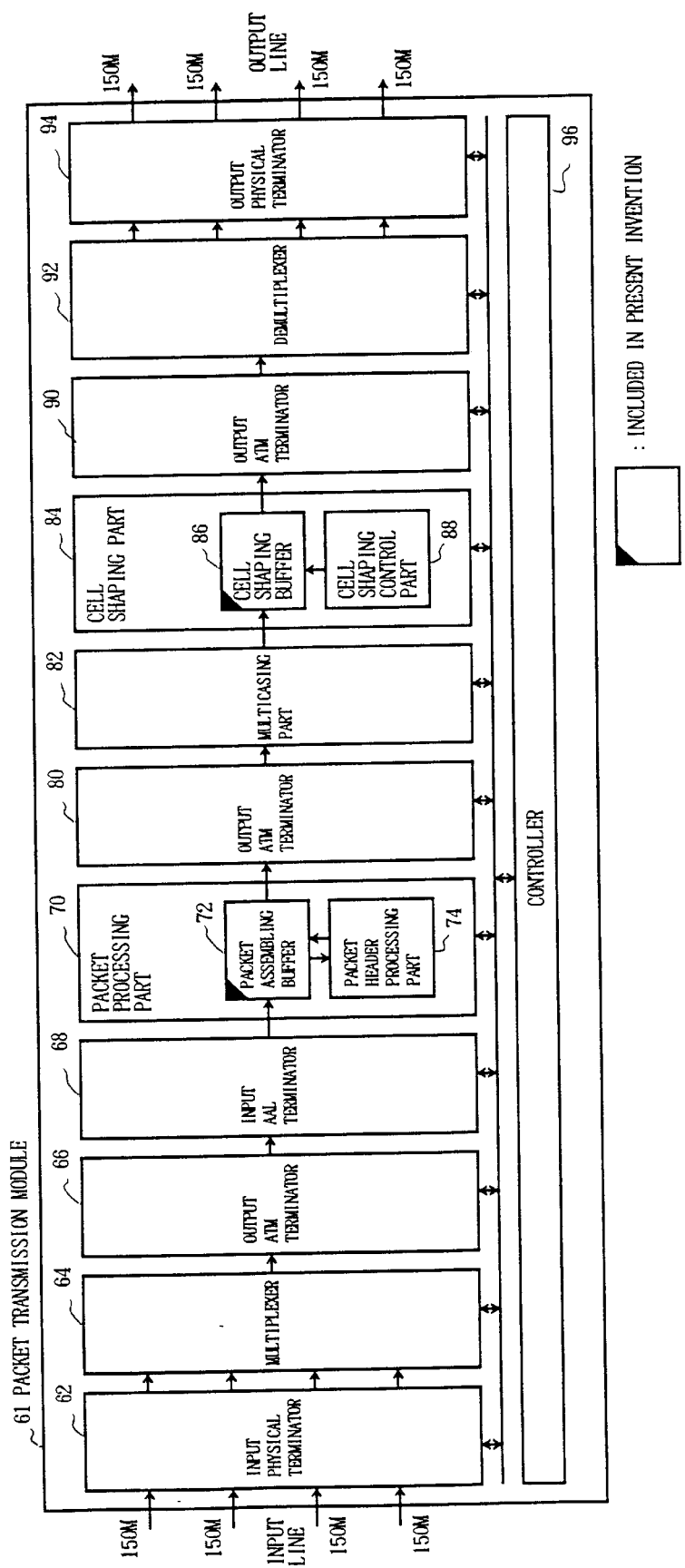
FIG. 25 is a block diagram showing a packet transmission module to which the present invention is applied.

FIG. 25 is a block diagram showing a packet transmission module 61 which uses the buffer control device of the present invention. The packet transmission module 61 includes an input physical terminator 62, a multiplexer 64, an output ATM terminator 66, an input AAL terminator 68, a packet processing part 70, an output AAL terminator 80, a multicasting part 82, a cell shaping part 84, an output ATM terminator 90, a demultiplexer 92, an output physical terminator 94, and a controller 96. The packet processing part 70 includes a packet assembling buffer 72 in which the buffer control device 10 of the present invention is applied, and a packet header processing part 74. The cell shaping part 84 includes a cell shaping buffer 84 in which the buffer control device 10 of the present invention is applied, and a cell shaping control part 88.

As shown in the figure, physical termination, multiplexing, ATM termination, and AAL termination are performed on input data port by port, and the data is input into the packet processing part 70. In the packet processing part 70, a packet is assembled per ATM connection (VPI/VCI) and an output connection is determined by header processing. Then, a cell is output and AAL terminated. If the output data is a multicast packet, the cell or packet will be replicated in the multicast part 82 and is input into the cell shaping part 84.

The cell shaping part 84 stores cells per each connection and outputs the cells at an established rate. Then, the cell is ATM terminated, demultiplexed, physically terminated and output to a line. The controller 96 initializes and controls each block, and the like.

According to the above-mentioned packet transmission module 61, since the buffer usage can be decreased during packet assembling and shaping, buffer overflow can be avoided.

Figure 26:
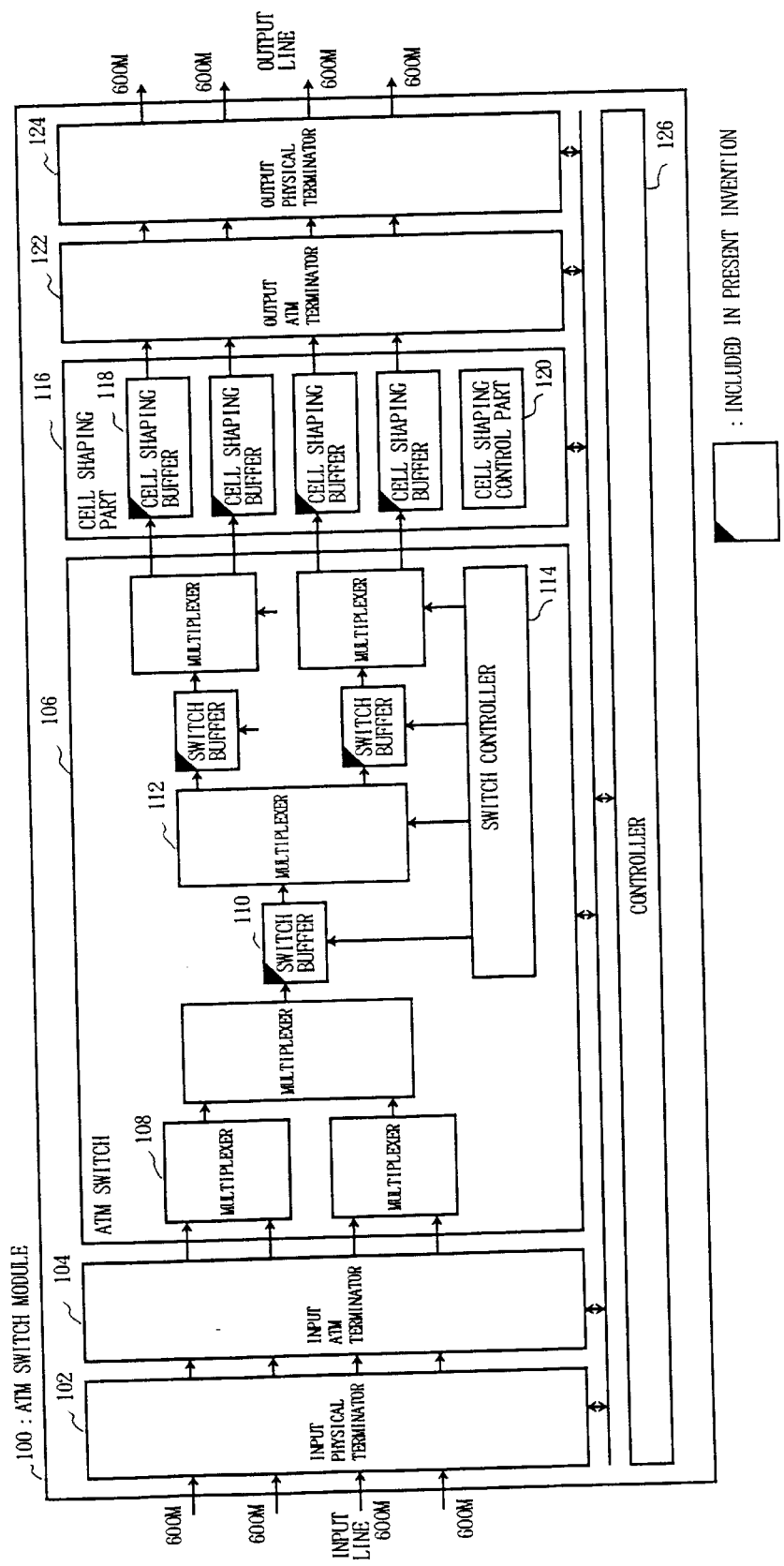
FIG. 26 is a block diagram showing an ATM switch module to which the present invention is applied.

FIG. 26 is a block diagram showing an ATM switch module 100 which includes the buffer control device 10 of the present invention. As shown in FIG. 26, the ATM switch module 100 includes an input physical terminator 102, an input ATM terminator 104, an ATM switch 106, a cell shaping part 116, an output ATM terminator 122 and an output physical terminator 124. The ATM switch 106 includes multiplexers 108, demultiplexers 112, a switch controller 114, and switch buffers 110 which use the buffer control device 10 of the present invention. The cell shaping part 116 includes cell shaping buffers 118 which use the buffer control device 10 of the present invention and a cell shaping control part 120.

As shown in FIG. 26, input data is physically terminated per each port, ATM terminated and input into the ATM switch 106. The ATM switch 106 multiplexes input data and stores input data into the switch buffer 110 per ATM connection (VPI/VCI).

The stored cell is output from the switch buffer 110 according to switch information from the switch control part 114 and is output to a destination line by the demultiplexer 112. If the capacity of the ATM switch is high, as shown in FIG. 26, the multistage switch buffers are provided. The cell which is output from the ATM switch 106 is stored in the cell shaping buffer 118 which outputs the cell at an established rate. Then, the cell is ATM terminated, physically terminated and output to a line. A control part 126 initializes and controls each block, and the like.

According to the above-mentioned ATM switch module, since the buffer usage can be decreased during switch processing, shaping and the like, buffer overflow can be avoided.

In the following, an application of the present invention in which the buffer control device 10 is used in a network will be described with reference to FIGS. 27–29. The application has an effect of preventing buffer overflow.

Figure 27:
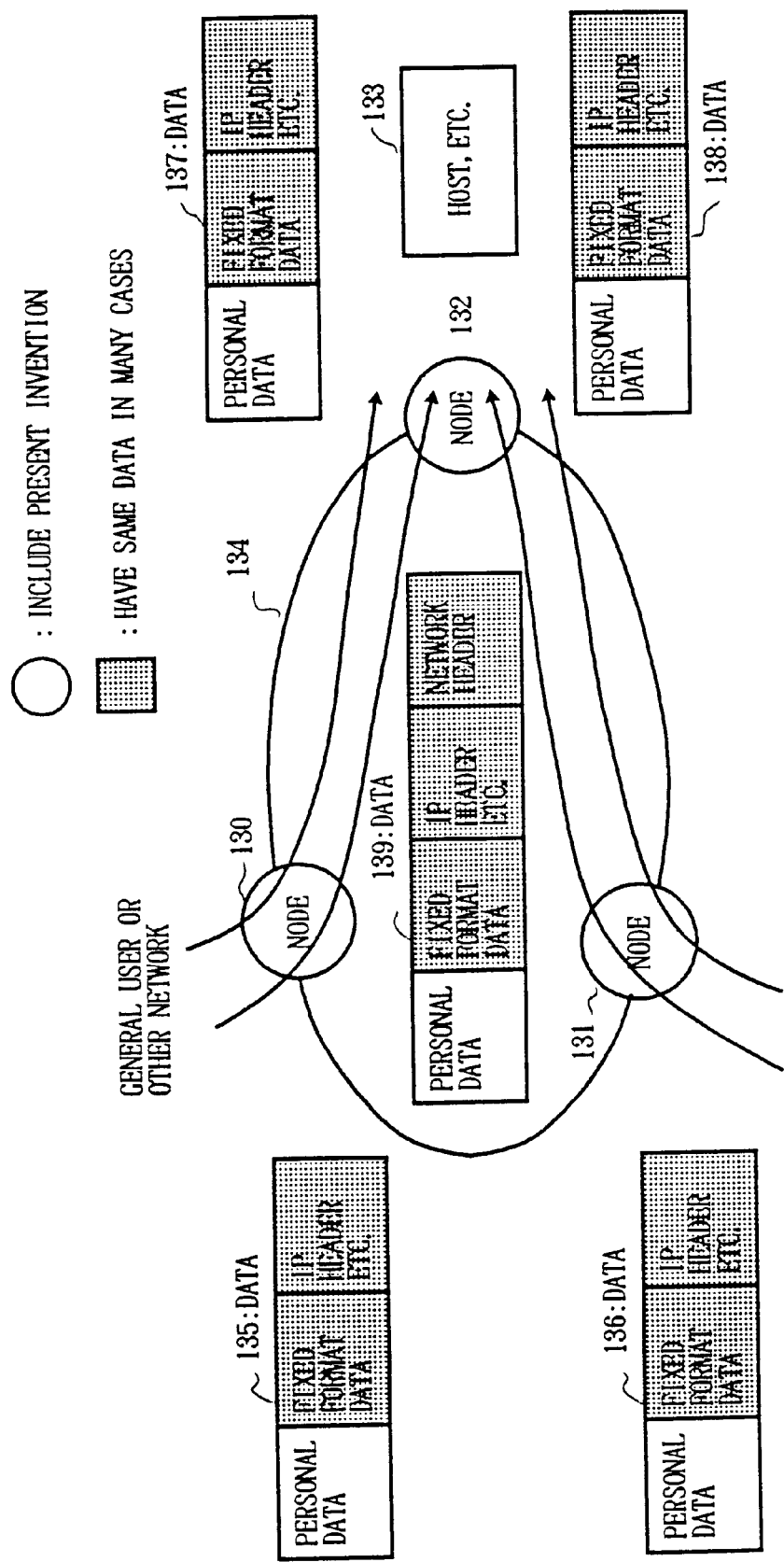
FIG. 27 is a diagram showing a network to which the present invention is applied in a case in which data is concentrated onto a node.

FIG. 27 is a diagram showing a network in which a large amount of data is intensively sent, for example, to a host. As shown in FIG. 27, three nodes, each of which has the buffer control device 10 of the present invention, are provided in a public network 134, and a large amount of data is intensively sent to a host 133. In this case, data is IP data. Such a case may occur, for example, in response to a questionnaire, when requesting a ticket at a designated time, and the like. The data packets associating with these events are generally temporary and are the same packets.

As shown in the data 135–139 in FIG. 27, the IP header and the network header respectively have a fixed format and the content of the headers are almost the same when the data is sent to the same node. Therefore, even if there is a large amount of data, buffer overflow can be prevented by the buffer control device 10 of the present invention.

Figure 28:
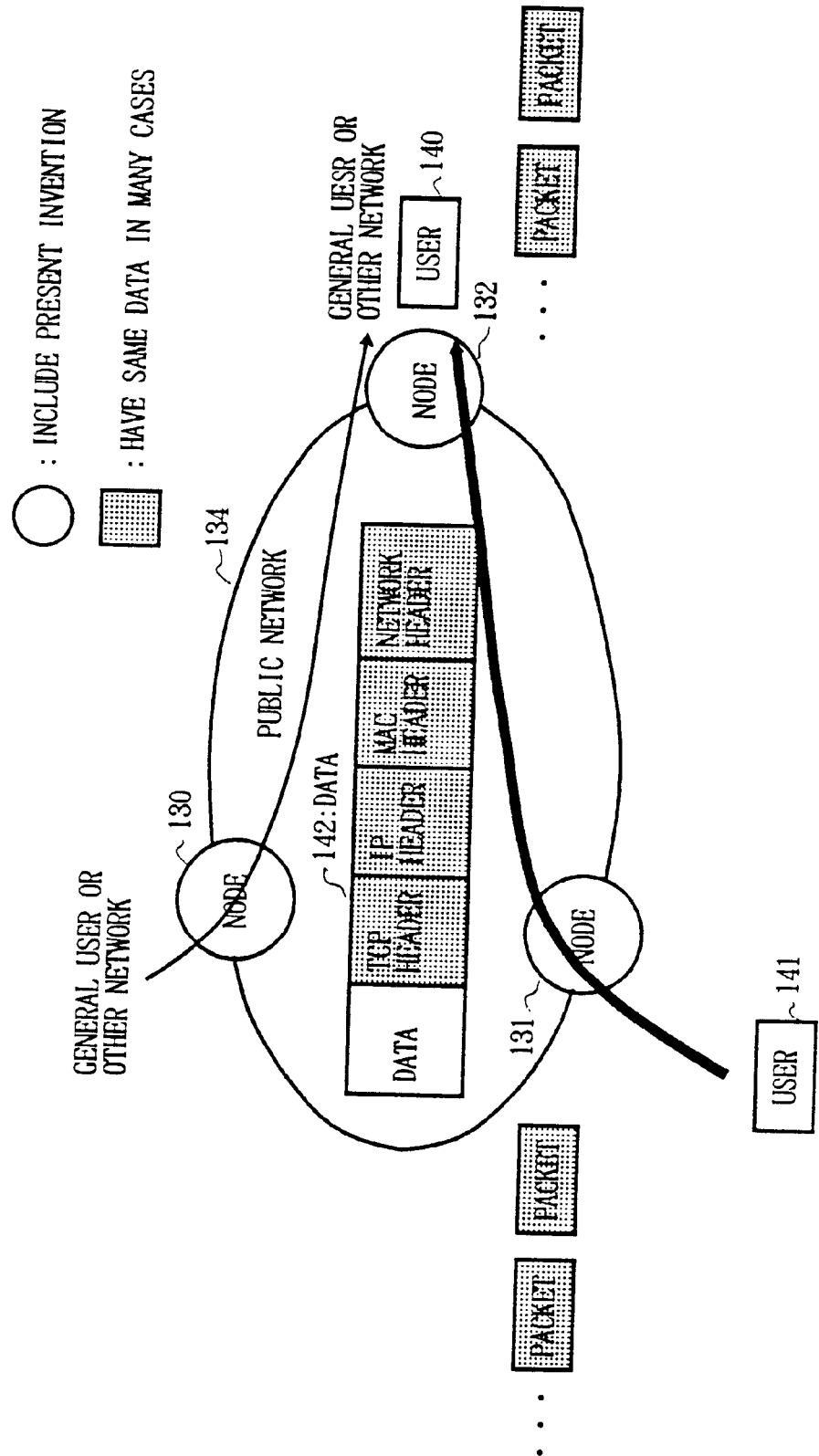
FIG. 28 is a diagram showing a network to which the present invention is applied in a case in which a large amount of packet data is transmitted between the same users.

FIG. 28 shows a case, for example, in which a large amount of packet data 142 is sent from a user 141 on an intranet to another user 140. As shown in FIG. 28, three nodes 130, 131, 132, each of which has the buffer control device 10 of the present invention, is provided in a public network 134. Since the data 142 is data on the intranet, each header of the data has a fixed format and there is a large amount of the same data. Therefore, even if data of general users and other networks arrives at the node 132, buffer overflow can be eliminated.

Figure 29:
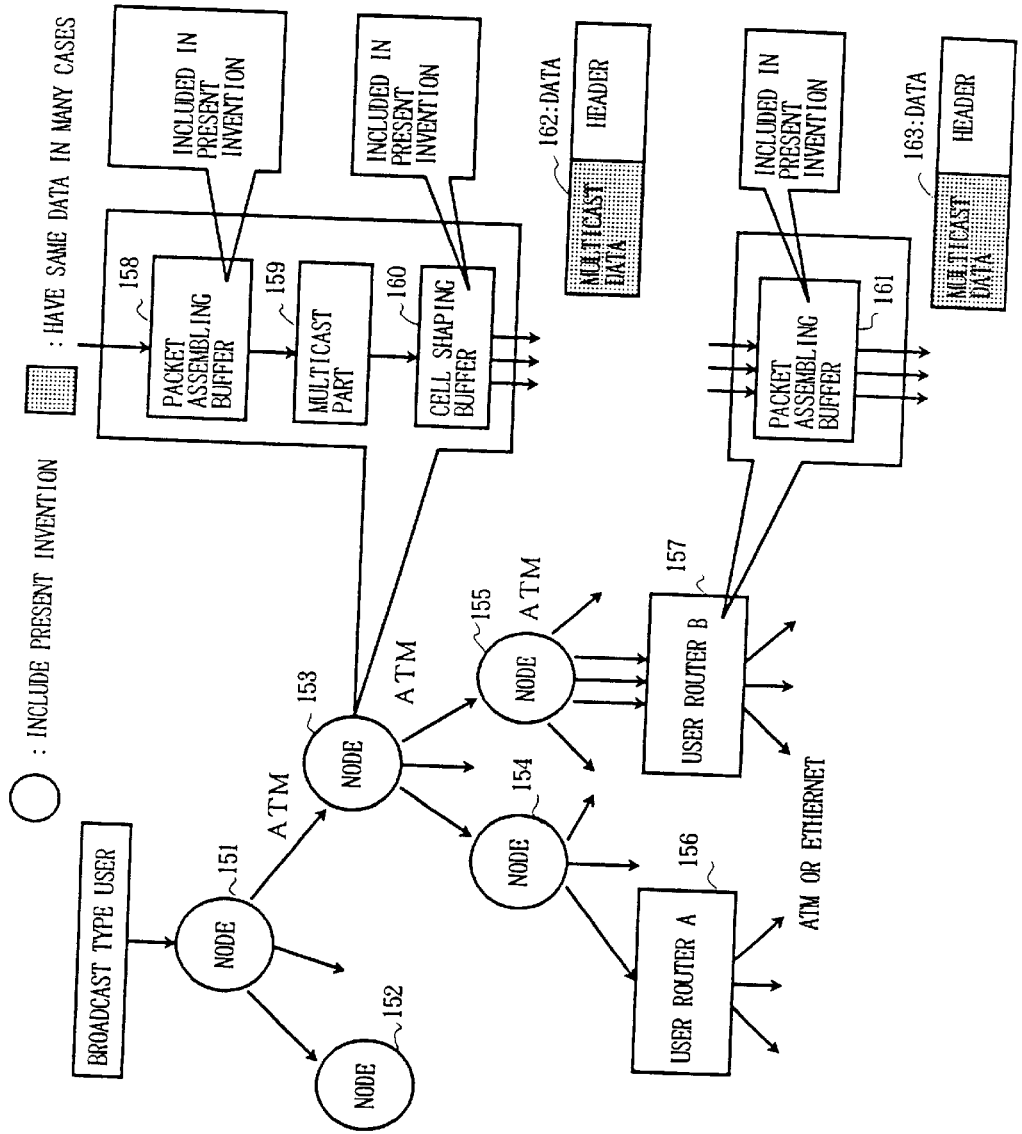
FIG. 29 is a diagram showing a network to which the present invention is applied in a case in which multicasting transmission is performed.

FIG. 29 shows a case in which multicast data is transmitted from a broadcast type user. As shown in FIG. 29, nodes 151–155, a user router A 156, and a user router B 157 have the buffer control device 10 of the present invention. Moreover, these nodes and routers except for the user router B 157 have a multicasting function.

In each node, a packet assembling buffer 158 which has the buffer control device 10 assembles ATM cells into a packet. A multicast part 159 replicates the packet into a plurality of packets for multicasting transmission, and, then, a cell shaping buffer 160 which has the buffer control device 10 of the present invention stores the packets.

Since the multicasting data includes a large amount of the same data, there is a noticeable effect of preventing buffer overflow and the like. Moreover, in the user router B 157, a packet assembling buffer 161 which has the buffer control device 10 of the present invention assembles ATM cells into a packet.

Since a large amount of data 163 which includes the same multicasting data is input into the user router B 157 which does not have the multicasting function, the effect of the buffer control device is remarkable.

As mentioned above, the buffer control device is configured such that a data pattern instead of received data is written in the buffer memory if the received data matches with the data pattern. Therefore, the usage of the buffer memory can be decreased and conventional problems such as buffer overflow can be avoided.

Further, since the data pattern is written in a fragmented data storing area, the usage of the buffer memory can be further decreased even if input data does not match with a data pattern successively. Moreover, according to the present invention, since the data pattern can be replaced, it is possible to increase a possibility of matching received data with the data patterns. As a result, the buffer memory can be used more effectively.

Furthermore, according to the present invention, a fixed format part and a variable part of received data can be compared with data patterns corresponding to each of parts. Therefore, the usage of the buffer memory can be decreased and buffer overflow and the like can be avoided more effectively by using codes corresponding to the fixed format part.

Therefore, according to the present invention, the buffer memory can be optimized, and since buffer overflow can be avoided particularly when output throughput is lower than input throughput and when packet processing is performed, the data buffer device with higher performance and quality can be obtained. In addition, the present invention is particularly effective in a case in which a large amount of the same data is transmitted as in multicasting and fraud data transmission.

The present invention is not limited to the specifically disclosed embodiments, and variations and modifications may be made without departing from the scope of the invention.

What is claimed is:

1. A buffer control method for controlling a buffer memory, said method comprising the steps of:
   comparing input data contained in a packet with one or more data patterns, each of which indicates a unique value;

storing a code which indicates a data pattern among said data patterns into said buffer memory if said input data matches with said data pattern; and recovering said input data from said code.

2. The buffer control method as claimed in claim 1, further comprising the steps of:

storing a first code in a first data storing area in said buffer memory if input data matches with a first data pattern among said data patterns, wherein said first code indicates said first data pattern;

storing input data in a second data storing area in said buffer memory if said input data does not match with any data patterns; and storing a second code in a third data storing area in said buffer memory if input data following any input data which does not match with any data patterns matches with a second data pattern, wherein said second code indicates said second data pattern.

3. The buffer control method as claimed in claim 1, further comprising the steps of:

storing a first code in a fragmented storing area in a first data storing area in said buffer memory if input data matches with a first data pattern among said data patterns, wherein said first code indicates said first data pattern; and storing input data in a second data storing area in said buffer memory if said input data does not match with any data pattern among said data patterns.

4. The buffer control method as claimed in claim 1, wherein each of said data patterns is a data pattern which is previously established.

5. The buffer control method as claimed in claim 1, further comprising a step of replacing one of said data patterns with a new data pattern.

6. The buffer control method as claimed in claim 1, further comprising a step of replacing one of said data patterns with a new data pattern if said one of said data patterns does not match with input data more than a predetermined number of times.

7. The buffer control method as claimed in claim 1, further comprising steps of:

giving a high priority to a first data pattern if said first data pattern matches with input data;

replacing a second data pattern having a low priority with a third data pattern if input data does not match with any one of said data patterns; and giving a high priority to said third data pattern.

8. The buffer control method as claimed in claim 1, further comprising steps of:

splitting input data into a plurality of parts; and comparing each of said parts with one or more data patterns corresponding to said each of said parts.

9. A buffer control device controlling a buffer memory, comprising:

a comparing unit which compares input data contained in a packet with one or more data patterns, each of which indicates a unique value;

a control unit which stores a code which indicates a data pattern among said data patterns into said buffer memory if said input data matches with said data pattern; and a recovering unit which recovers said input data from said code.

10. The buffer control device as claimed in claim 9, wherein said control unit stores a first code in a first data storing area in said buffer memory if input data matches with a first data pattern among said data patterns, wherein said first code indicates said first data pattern;

wherein said control unit stores input data in a second data storing area in said buffer memory if said input data does not match with any data patterns; and wherein said control unit stores a second code in a third data storing area in said buffer memory if input data following any input data which does not match with any data patterns matches with a second data pattern, wherein said second code indicates said second data pattern.

11. The buffer control device as claimed in claim 9, wherein said control unit stores a first code in a fragmented storing area in a first data storing area in said buffer memory if input data matches with a first data pattern among said data patterns, wherein said first code indicates said first data pattern; and wherein said control unit stores input data in a second data storing area in said buffer memory if said input data does not match with any data pattern among said data patterns.

12. The buffer control device as claimed in claim 9, wherein each of said data patterns is a data pattern which is previously established.

13. The buffer control device as claimed in claim 9, further comprising a unit which replaces one of said data patterns with a new data pattern.

14. The buffer control device as claimed in claim 9, further comprising an update unit which replaces one of said data patterns with a new data pattern if said one of said data patterns does not match with input data more than a predetermined number of times.

15. The buffer control device as claimed in claim 9, further comprising an update unit which gives a high priority to a first data pattern if said first data pattern matches with input data, and wherein said update unit replaces a second data pattern having a low priority with a third data pattern if input data does not match with any one of said data patterns and said update unit gives a high priority to said third data pattern.

16. The buffer control device as claimed in claim 9, further comprising a unit which splits input data into a plurality of parts, wherein said comparing unit compares each of said parts with one or more data patterns corresponding to said each of said parts.

* * * * *